(12) United States Patent
Miyazawa

(10) Patent No.: US 7,065,487 B2
(45) Date of Patent: Jun. 20, 2006

(54) SPEECH RECOGNITION METHOD, PROGRAM AND APPARATUS USING MULTIPLE ACOUSTIC MODELS

(75) Inventor: Yasunaga Miyazawa, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 609 days.

(21) Appl. No.: 09/981,996

(22) Filed: Oct. 19, 2001

(65) Prior Publication Data

US 2002/0049587 A1  Apr. 25, 2002

(30) Foreign Application Priority Data

Oct. 23, 2000   (JP)   ............................. 2000-322914

(51) Int. Cl.
*G10L 15/20* (2006.01)
*G10L 15/06* (2006.01)
*G10L 15/28* (2006.01)

(52) U.S. Cl. ...................... 704/233; 704/243; 704/255

(58) Field of Classification Search ................. 704/233
See application file for complete search history.

(56) References Cited

U.S. PATENT DOCUMENTS

| | | | | |
|---|---|---|---|---|
| 5,761,639 A | * | 6/1998 | Takebayashi et al. | 704/253 |
| 5,890,113 A | * | 3/1999 | Takagi | 704/231 |
| 5,917,944 A | * | 6/1999 | Wakisaka et al. | 382/190 |
| 5,960,397 A | * | 9/1999 | Rahim | 704/244 |
| 5,970,446 A | * | 10/1999 | Goldberg et al. | 704/233 |
| 6,148,105 A | * | 11/2000 | Wakisaka et al. | 382/190 |
| 6,381,569 B1 | * | 4/2002 | Sih et al. | 704/233 |
| 6,449,594 B1 | * | 9/2002 | Hwang et al. | 704/233 |
| 6,510,408 B1 | * | 1/2003 | Hermansen | 704/233 |
| 6,529,866 B1 | * | 3/2003 | Cope et al. | 704/205 |
| 6,631,348 B1 | * | 10/2003 | Wymore | 704/233 |
| 2002/0077813 A1 | * | 6/2002 | Erell | 704/233 |
| 2003/0036902 A1 | * | 2/2003 | Gadde | 704/233 |

* cited by examiner

*Primary Examiner*—Susan McFadden
*Assistant Examiner*—Matthew J. Sked
(74) *Attorney, Agent, or Firm*—Oliff & Berridge, PLC

(57) ABSTRACT

The present invention provides a speech recognition method for achieving a high recognition rate even under an environment where plural types of noise exist. Noise is eliminated by the spectral subtraction noise elimination method from each of speech data on which different types of noise are superposed, and acoustic models corresponding to each of the noise types are created based on the feature vectors obtained by analyzing the features of each of the speech data which have undergone the noise elimination. When a speech recognition is performed, a first speech feature analysis is performed on speech data to be recognized, and it is determined whether the speech data is a noise segment or a speech segment. When a noise segment is detected, the feature data thereof is stored, and when a speech segment is detected, the type of the noise is determined based on the feature data which has been stored, and a corresponding acoustic model is selected based on the result thereof. The noise is eliminated by the spectral subtraction noise elimination method from the speech data to be recognized, and a second feature analysis is performed on the speech data which has undergone the noise elimination to obtain a feature vector to be used in speech recognition.

42 Claims, 6 Drawing Sheets

SPEECH RECOGNITION METHOD, PROGRAM AND APPARATUS USING MULTIPLE ACOUSTIC MODELS

BACKGROUND OF THE INVENTION

1. Field of Invention

The present invention relates to a speech recognition method, a storage medium storing a speech recognition program, and a speech recognition apparatus capable of achieving a high accuracy of recognition even under an environment where various background noises are present.

2. Description of Related Art

In recent years, devices incorporating speech recognition functionality have been widely used. The devices are used under various environments, and in many cases under environments including a large amount of noise.

In such cases, obviously, countermeasures must be taken against noise. Examples of noise include, stationary noises such as the sound of an automobile and the sound of an air conditioner. Speech recognition methods described below have been used for performing speech recognition under an environment where such stationary noises are present.

As a first example, speech recognition may be performed by superposing noise data obtained from the stationary noises described above on speech data taken under a noise-free environment, creating an acoustic model by learning the speech data, and using the acoustic model.

As a second example, speech recognition may be performed, by a spectral subtraction method. According to this speech recognition method, the noise component is eliminated from input speech data, and a speech recognition is performed on the speech data which has undergone the noise elimination. In this case as well, similarly to the above, noise data obtained from the stationary noises are superposed on speech data taken under a noise-free environment, the noise is eliminated by the spectral subtraction method from the speech data, an acoustic model is created by learning the speech data which has undergone the noise elimination, and a speech recognition is performed based on the acoustic model.

SUMMARY OF THE INVENTION

Use of the speech recognition methods described above improves the accuracy of recognition under a noisy environment to a certain extent compared with the case where no countermeasure is taken. However, problems still remain. More specifically, the stationary noises include various types such as the bustle of the city as well as the sound of an automobile and the sound of an air conditioner mentioned above, each having different characteristics.

The acoustic models in the examples above are typically created by learning only a particular type of noise. For example, the sound of an automobile is used as noise data, the noise data is superposed is superposed on speech data, the noise is eliminated from the speech data by the spectral subtraction method, and an acoustic model for speech recognition is created by learning the speech data which has undergone the noise elimination.

If speech recognition is performed based on an acoustic model created for a particular type of noise, a relatively satisfactory result can be obtained under an environment where the type of noise is present. However, other types of noise may be present under different environments, in which case the recognition rate obviously falls.

Furthermore, as well as the types of noise, S/N ratio which represents the ratio of a speech signal to be recognized to a noise signal affects the accuracy of recognition.

Accordingly, an object of the present invention is to achieve a high accuracy of recognition in accordance with the type and S/N ratio of a noise and allowing implementation in inexpensive hardware using a CPU with a relatively low operation capability.

To this end, according to a speech recognition method of the present invention, speech data on which different types of noise are superposed respectively are created. The noise is eliminated by a predetermined noise elimination method from each of the speech data on which the noise is superposed, and acoustic models corresponding to each of the noise types are created and stored using the feature vectors of each of the speech data which have undergone the noise elimination. When a speech recognition is performed, the type of a noise superposed on speech data to be recognized is determined. A corresponding acoustic model is selected from the acoustic models corresponding to each of the noise types based on the result of the determination. The noise is eliminated by the predetermined noise elimination method from the speech data to be recognized on which the noise is superposed, and a speech recognition is performed on the feature vector of the speech data which has undergone the noise elimination based on the selected acoustic model.

According to a storage medium storing a speech recognition program of the present invention, the speech recognition program can include the step of creating speech data on which different types of noise are superposed respectively, eliminating the noise by a predetermined noise elimination method from each of the speech data on which the noise is superposed, and creating acoustic models corresponding to each of the noise types using the feature vectors obtained by analyzing the features of each of the speech data which have undergone the noise elimination, and storing the acoustic models in acoustic model storage device. The step of determining the type of a noise superposed on speech data to be recognized, and selecting a corresponding acoustic model from the acoustic models stored in the acoustic model storage device can be based on the result of the determination. The step of eliminating the noise by the predetermined noise elimination method from the speech data to be recognized on which the noise is superposed and the step of performing a speech recognition on the feature vector of the speech data which has undergone the noise elimination can be based on the selected acoustic model.

In each of the inventions, the noise elimination method may be the spectral subtraction method or the continuous spectral subtraction method, and the acoustic models are created by eliminating the noise by the spectral subtraction method or the continuous spectral subtraction method from each of the speech data on which the different types of noise are superposed, obtaining the feature vectors of each of the speech data which have undergone the noise elimination, and using the feature vectors. When a speech recognition is performed, a first speech feature analysis can be performed to obtain the frequency-domain feature data of the speech data on which the noise is superposed. It is determined whether the speech data is a noise segment or a speech segment based on the result of the feature analysis, and when a noise segment is detected, the feature data thereof is stored. Whereas, when a speech segment is detected, the type of the noise superposed is determined based on the feature data having been stored and a corresponding acoustic model is selected from the acoustic models corresponding to each of the noise types based on the result of the determination. The noise is eliminated by the spectral subtraction method or the continuous spectral subtraction method from the speech data to be recognized on which the noise is superposed, and a second feature analysis is performed on the speech data which has undergone the noise elimination to obtain feature data required in the speech recognition, and a speech recognition is performed on the result of the feature analysis based on the selected acoustic model.

Alternatively, the noise elimination method may be the cepstrum mean normalization method, and the acoustic models are created by eliminating the noise by the cepstrum mean normalization method from each of the speech data on which the different types of noise are superposed and using the feature vectors of the speech data obtained thereby. When a speech recognition is performed, a first speech feature analysis is performed on the speech data to be recognized on which the noise is superposed to obtain a feature vector representing cepstrum coefficients. It is determined whether the speech data is a noise segment or a speech segment based on the result of the feature analysis. When a noise segment is detected, the feature vector thereof is stored. When a speech segment is detected, the feature data of the speech segment from the beginning through the end thereof is stored. The type of the noise superposed is determined based on the feature vector of the noise segment having been stored, and an acoustic model is selected from the acoustic models corresponding to each of the noise types based on the result of the determination. The noise is eliminated by the cepstrum mean normalization method from the speech segment on which the noise is superposed using the feature vector of the speech segment having been stored, and a speech recognition is performed on the feature vector after the noise elimination based on the selected acoustic model.

Furthermore, the acoustic models may be created corresponding to a plurality of S/N ratios for each of the noise types, and the acoustic models corresponding to the plurality of S/N ratios for each of the noise types are created by generating speech data on which noises with the plurality of S/N ratios for each of the noise types are respectively superposed, eliminating the noises from each of the speech data by a predetermined noise elimination method, and using the feature vectors of each of the speech data which have undergone the noise elimination.

When the acoustic models are created corresponding to the plurality of S/N ratios for each of the noise types, in addition to determining the type of the noise superposed on the speech data to be recognized, the S/N ratio may be obtained from the magnitude of the noise in the noise segment and the magnitude of the speech in the speech segment, and an acoustic model is selected based on the noise type determined and the S/N ratio obtained.

According to another speech recognition method, speech data on which different types of noise are superposed respectively are created. The noise can be eliminated by the spectral subtraction method or the continuous spectral subtraction method from each of the speech data on which the different types of noise are superposed. The cepstrum mean normalization method can be applied to each of the speech data which have undergone the noise elimination to obtain the feature vectors of a speech segment, and acoustic models corresponding to each of the noise types can be created and stored based on the feature vectors. When a speech recognition is performed, a first speech feature analysis is performed to obtain the frequency-domain feature data of speech data to be recognized. It is determined whether the speech data is a noise segment or a speech segment based on the result of the feature analysis. When a noise segment is detected, the feature vector thereof is stored. When a speech segment is detected, the noise is eliminated from the speech segment by the spectral subtraction method or the continuous spectral subtraction method. A second speech feature analysis can then be performed on the speech segment data which has undergone the noise elimination to obtain cepstrum coefficients, and the feature vector of the speech segment can be stored. When the speech segment has terminated, the type of the noise superposed is determined based on the feature data of the noise segment having been stored, and an acoustic model is selected from the acoustic models corresponding to each of the noise types. The cepstrum mean normalization method can be applied to the feature vector of the speech segment on which the noise is superposed, using the feature vector of the speech segment having been stored, to obtain the feature vector of the speech segment. A speech recognition can be performed on the feature vector obtained by the cepstrum mean normalization method based on the selected acoustic model.

According to another storage medium storing a speech recognition program of the present invention, the speech recognition program can include the step of creating speech data on which different types of noise are superposed respectively, eliminating the noise by the spectral subtraction method or the continuous spectral subtraction method from each of the speech data on which the different types of noise are superposed. The speech recognition program can further include applying the cepstrum mean normalization method to each of the speech data which have undergone the noise elimination to obtain the feature vectors of a speech segment, and creating acoustic models corresponding to each of the noise types based on the feature vectors and storing the acoustic models in acoustic model storage means, the step of performing a first speech feature analysis to obtain the frequency-domain feature data of speech data to be recognized on which a noise is superposed, the step of determining whether the speech data is a noise segment or a speech segment based on the result of the feature analysis, and storing the feature vector thereof when a noise segment is detected, the step of eliminating the noise from the speech segment by the spectral subtraction method or the continuous spectral subtraction method when a speech segment is detected, the step of performing a second speech feature analysis on the speech segment data which has undergone the noise elimination to obtain cepstrum coefficients, and storing the feature vector of the speech segment. The speech recognition program can further include the step of, when the speech segment has terminated, determining the type of the noise superposed based on the feature data of the noise segment having been stored, and selecting an acoustic model from the acoustic models corresponding to each of the noise types, the step of applying the cepstrum mean normalization method to the feature vector of the speech segment on which the noise is superposed, using the feature vector of the speech segment having been stored, to obtain the feature vector of the speech segment, and the step of performing a speech recognition on the feature vector obtained by the cepstrum mean normalization method based on the selected acoustic model.

In the speech recognition method and the storage medium storing the speech recognition program, the acoustic models may be created corresponding to a plurality of S/N ratios for each of the noise types. The acoustic models corresponding to the plurality of S/N ratios for each of the noise types are created by generating speech data on which noises with the plurality of S/N ratios for each of the noise types are respectively superposed, eliminating the noises from each of the speech data by the spectral subtraction method or the continuous spectral subtraction method, and using the feature vectors of each of the speech data obtained by applying the cepstrum mean normalization method to each of the speech data which have undergone the noise elimination.

When the acoustic models are created corresponding to the plurality of S/N ratios for each of the noise types, in addition to determining the type of the noise superposed on the speech data to be recognized, the S/N ratio may be obtained from the magnitude of the noise in the noise segment and the magnitude of the speech in the speech segment, and an acoustic model is selected based on the noise type determined and the S/N ratio obtained.

According to a speech recognition method of the present invention, speech data on which a particular type of noise with different S/N ratios are superposed respectively are created, the noise is eliminated by a predetermined noise elimination method from each of the speech data, and acoustic models corresponding to each of the S/N ratios are created and stored using the feature vectors of each of the speech data which have undergone the noise elimination. When a speech recognition is performed, the S/N ratio of a noise superposed on speech data to be recognized can be determined, a corresponding acoustic model can be selected from the acoustic models corresponding to each of the S/N ratios based on the result of the determination, the noise can be eliminated by the predetermined noise elimination method from the speech data to be recognized on which the noise is superposed, and a speech recognition can be performed on the feature vector of the speech data which has undergone the noise elimination based on the selected acoustic model.

According to a storage medium storing a speech recognition program of the present invention, the speech recognition program can include the step of creating speech data on which a particular type of noise with different S/N ratios are superposed respectively, eliminating the noise by a predetermined noise elimination method from each of the speech data, and creating acoustic models corresponding to each of the S/N ratios using the feature vectors of each of the speech data which have undergone the noise elimination and storing the acoustic models in acoustic model storage means. The speech recognition program can also include the step of determining the S/N ratio of a noise superposed on speech data to be recognized, and selecting a corresponding acoustic model from the acoustic models corresponding to each of the S/N ratios based on the result of the determination, the step of eliminating the noise by the predetermined noise elimination method from the speech data to be recognized on which the noise is superposed, and the step of performing a speech recognition on the feature vector of the speech data which has undergone the noise elimination based on the selected acoustic model.

In each of the inventions, the noise elimination method may be the spectral subtraction method or the continuous spectral subtraction method, and the noise elimination method may be the cepstrum mean normalization method.

A speech recognition apparatus of the present invention may include acoustic models corresponding to each of different types of noise, created by generating speech data on which the different types of noise are superposed respectively, eliminating the noise by a predetermined noise elimination method from each of the speech data on which the different types of noise are superposed, and using the feature vectors of each of the speech data which have undergone the noise elimination. The present invention may further include acoustic model storage device for storing the acoustic models, noise determination device for determining the type of a noise superposed on speech data to be recognized, acoustic model selection device for selecting a corresponding acoustic model from the acoustic models corresponding to each of the noise types based on the result of the determination, noise elimination device for eliminating the noise by the predetermined noise elimination method from the speech data to be recognized on which the noise is superposed, and speech recognition device for performing a speech recognition on the feature vector of the speech data which has undergone the noise elimination based on the selected acoustic model.

In the speech recognition apparatus, the noise elimination method may be the spectral subtraction method or the continuous spectral subtraction method, and the acoustic models are created by eliminating the noise by the spectral subtraction method or the continuous spectral subtraction method from each of the speech data on which the different types of noise are superposed, obtaining the feature vectors of each of the speech data which have undergone the noise elimination, and using the feature vectors. The speech recognition apparatus can include an acoustic model storage device for storing the acoustic models thus created, first speech feature analysis device for performing a first speech feature analysis to obtain the frequency-domain feature data of the speech data on which the noise is superposed, noise segment/speech segment determination device for determining whether the speech data is a noise segment or a speech segment based on the result of the feature analysis, and when a noise segment is detected, storing the feature data thereof in feature data storage means. The speech recognition apparatus can further include a noise type determination device for determining the type of noise the type of the noise superposed based on the feature data having been stored when a speech segment is detected, an acoustic model selection device for selecting a corresponding acoustic model from the acoustic models corresponding to each of the noise types based on the result of the determination, a noise elimination device for eliminating the noise by the spectral subtraction method or the continuous spectral subtraction method from the speech data to be recognized on which the noise is superposed, a second speech feature analysis device for performing a second feature analysis on the speech data which has undergone the noise elimination to obtain feature data required in the speech recognition, and speech recognition device for performing a speech recognition on the result of the feature analysis based on the selected acoustic model.

The noise elimination method may be the cepstrum mean normalization method, and the acoustic models are created by eliminating the noise by the cepstrum mean normalization method from each of the speech data on which the different types of noise are superposed and using the feature vectors of the speech data obtained thereby. The speech recognition apparatus may can include an acoustic model storage device for storing the acoustic models thus created, a feature analysis device for performing a first speech feature analysis on the speech data to be recognized on which the noise is superposed to obtain a feature vector representing cepstrum coefficients, a noise segment/speech segment determination device for determining whether the speech data is a noise segment or a speech segment based on the result of the feature analysis, and storing the feature vector thereof in feature data storage means when a noise segment is detected whereas when a speech segment is detected, storing the feature data of the speech segment from the beginning through the end thereof in the feature data storage device. The speech recognition apparatus can further include a noise type determination device for determining the type of the noise superposed based on the feature vector of the noise segment having been stored in the feature data storage device, an acoustic model selection device for selecting a corresponding acoustic model from the acoustic models corresponding to each of the noise types based on the result of the determination, a noise elimination device for eliminating the noise by the cepstrum mean normalization method from the speech segment on which the noise is superposed using the feature vector of the speech segment having been stored, and speech recognition device for performing a speech recognition on the feature vector after the noise elimination based on the selected acoustic model.

The acoustic models may be created corresponding to a plurality of S/N ratios for each of the noise types, and the acoustic models corresponding to the plurality of S/N ratios for each of the noise types are created by generating speech data on which noises with the plurality of S/N ratios for each of the noise types are respectively superposed, eliminating the noises from each of the speech data by a predetermined noise elimination method, and using the feature vectors of each of the speech data which have undergone the noise elimination.

When the acoustic models are created corresponding to the plurality of S/N ratios for each of the noise types, in addition to determining the type of the noise superposed on the speech data to be recognized, the noise type determination device may obtain the S/N ratio from the magnitude of the noise in the noise segment and the magnitude of the speech in the speech segment, and the acoustic model selection device may select an acoustic model based on the noise type determined and the S/N ratio obtained.

Another speech recognition apparatus of the present invention can include acoustic models corresponding to each of different types of noise, created by generating speech data on which the different types of noise are superposed respectively, eliminating the noise by the spectral subtraction method or the continuous spectral subtraction method from each of the speech data on which the different types of noise are superposed, applying the cepstrum mean normalization method to each of the speech data which have undergone the noise elimination to obtain the feature vectors of a speech segment, and using the feature vectors. The speech recognition apparatus can further include an acoustic model storage device for storing the acoustic models, a first speech feature analysis device for performing a first speech feature analysis to obtain the frequency-domain feature data of speech data to be recognized, a noise segment/speech segment determination device for determining whether the speech data is a noise segment or a speech segment based on the result of the feature analysis, and storing the feature vector thereof in feature data storage means when a noise segment is detected, a noise elimination device for eliminating the noise from the speech segment by the spectral subtraction method or the continuous spectral subtraction method when a speech segment is detected, a second speech feature analysis device for performing a second speech feature analysis on the speech segment data which has undergone the noise elimination to obtain cepstrum coefficients, and storing the feature vector of the speech segment in the feature data storage means, a noise type determination device for determining, when the speech segment has terminated, the type of the noise superposed based on the feature data of the noise segment having been stored, an acoustic model selection device for selecting a corresponding acoustic model from the acoustic models corresponding to each of the noise types, a cepstrum mean normalization operation device for applying the cepstrum mean normalization method to the feature vector of the speech segment on which the noise is superposed, using the feature vector of the speech segment having been stored, to output the feature vector of the speech segment, and a speech recognition device for performing a speech recognition on the feature vector based on the selected acoustic model.

In the speech recognition apparatus, the acoustic models may be created corresponding to a plurality of S/N ratios for each of the noise types, and the acoustic models corresponding to the plurality of S/N ratios for each of the noise types are created by generating speech data on which noises with the plurality of S/N ratios for each of the noise types are respectively superposed, eliminating the noises from each of the speech data by the spectral subtraction method or the continuous spectral subtraction method, and using the feature vectors of each of the speech data obtained by applying the cepstrum mean normalization method to each of the speech data which have undergone the noise elimination.

When the acoustic models are created corresponding to the plurality of S/N ratios for each of the noise types, in addition to determining the type of the noise superposed on the speech data to be recognized, the noise type determination device may obtain the S/N ratio from the magnitude of the noise in the noise segment and the magnitude of the speech in the speech segment, and the acoustic model selection device may select an acoustic model based on the noise type determined and the S/N ratio obtained.

A speech recognition apparatus of the present invention can include acoustic models corresponding to each of different S/N ratios for a particular type of noise, created by generating speech data on which the particular type of noise with the different S/N ratios are superposed respectively, eliminating the noise by a predetermined noise elimination method from each of the speech data, and using the feature vectors of each of the speech data which have undergone the noise elimination. The speech recognition apparatus can further include an acoustic models storage device for storing the acoustic models, a S/N ratio determination device for determining the S/N ratio of a noise superposed on speech data to be recognized an acoustic model selection device for selecting a corresponding acoustic model from the acoustic models corresponding to each of the S/N ratios based on the result of the determination, a noise elimination device for eliminating the noise by the predetermined noise elimination method from the speech data to be recognized on which the noise is superposed, and a speech recognition device for performing a speech recognition on the feature vector of the speech data which has undergone the noise elimination based on the selected acoustic model.

The noise elimination method may be the spectral subtraction method or the continuous spectral subtraction method, and the noise elimination method may be the cepstrum mean normalization method.

As described above, according to the present invention, speech data on which different types of noise are superposed respectively are created, and the noise is eliminated from each of the speech data on which the noise is superposed, and acoustic models corresponding to each of the noise types are created using the speech data which have undergone the noise elimination. When a speech recognition is actually performed, the type of a noise superposed on speech data to be recognized is determined, and an acoustic model is selected from the acoustic models corresponding to the noise types based on the result of the determination, the noise is eliminated from the speech data to be recognized on which the noise is superposed by the predetermined noise elimination method, and a speech recognition is performed on the speech data which has undergone the noise elimination based on the selected acoustic model.

Accordingly, the speech recognition is performed based on a most suitable acoustic model in accordance with the type of the noise superposed, achieving a high recognition rate even under a noisy environment.

In particular, if a device is used under an environment where two or three types of stationary noise are present, a high recognition rate can be achieved by creating acoustic models for each of the noise types and performing a speech recognition as described above based on the acoustic models.

One of the noise elimination method which may be employed according to the present invention is the spectral subtraction method or the continuous spectral subtraction method, in which case the noise elimination in the acoustic model creation process is performed by the spectral subtraction method or the continuous spectral subtraction method. When a speech recognition is actually performed, the type of a noise superposed is determined using the feature analysis data of the noise segment, a most suitable acoustic model is selected based on the result of the determination, the noise is eliminated by the spectral subtraction method or the continuous spectral subtraction method from the speech data to be recognized on which the noise is superposed, and a speech recognition is performed on the result of a feature analysis of the speech data which has undergone the noise elimination based on the selected acoustic model.

By employing the spectral subtraction method or the continuous spectral subtraction method as described above, noise elimination can be executed with a relatively small amount of operations feasible for a CPU with a relatively low operation capability. Accordingly, implementation in small-scale inexpensive hardware is possible. Furthermore, the spectral subtraction method and the continuous spectral subtraction method are believed to be effective in eliminating noise such as the sound of an automobile, the sound of an air conditioner, and the bustle of the city (generally referred to as additive noise), it is highly advantageous when applied to devices typically used under an environment with a considerable amount of such noise.

As another example of noise elimination method, the cepstrum mean normalization method may be employed. In that case, the noise elimination in the acoustic model creating process employs the cepstrum mean normalization method. When a speech recognition is actually performed, the type of a noise superposed is determined using the feature analysis data of the noise segment, a most suitable acoustic model is selected based on the result of the determination, the noise is eliminated from the speech data to be recognized on which the noise is superposed by the cepstrum normalization method, and a speech recognition is performed on the feature vector obtained by the noise elimination based on the selected acoustic model.

By employing the cepstrum mean normalization method as the noise elimination method, noise elimination can be performed with a small amount of operations feasible for a CPU with relatively low operation capability. This permits implementation in small-scale inexpensive hardware. Furthermore, because the cepstrum mean normalization method is believed to be effective in eliminating noise such as distortions due to microphone characteristics and spatial transmission characteristics including echo (generally referred to as multiplicative noise), it is highly advantageous when applied to devices typically used under an environment where such noise is likely to be present.

Furthermore, in addition to the noise types, the acoustic models may be created for different S/N ratios for each of the noise types, so that when a speech recognition is actually performed, the S/N ratio of the noise superposed on the speech data to be recognized is obtained from the power of the noise segment and the power of the speech segment and an acoustic model in accordance with the S/N ratio and the noise type is selected, allowing recognition based on an acoustic model in accordance with the power of the noise as well as the noise type. Accordingly, a high recognition rate can be achieved when a speech recognition is performed under environments where each of the noises exist.

Furthermore, the acoustic models may be created using both the spectral subtraction method or the continuous spectral subtraction method and the cepstrum normalization method. In this case, when a speech recognition is actually performed, noise is eliminated by the spectral subtraction method or the continuous spectral subtraction method, and the feature vector of the speech data which has undergone the noise elimination is generated by the cepstrum mean normalization method and the feature vector is supplied to the speech recognition unit for speech recognition, achieving a high accuracy of recognition, and in this case, allowing compatibility with a wide range of noise including the additive noise and the multiplicative noise described earlier.

Furthermore, the present invention may be applied to speech recognition involving a particular type of noise with a plurality of S/N ratios. In that case, speech data on which the particular type of noise with the plurality of S/N ratios are respectively superposed are created, the noise is eliminated by a predetermined noise elimination method from each of the speech data, and acoustic models corresponding to each of the S/N ratios are created using the feature vectors of each of the speech data which have undergone the noise elimination. When a speech recognition is actually performed, the S/N ratio of a noise superposed on speech data to be recognized is determined, a corresponding acoustic model is selected from the acoustic models corresponding to each of the S/N ratios, the noise is eliminated by the predetermined noise elimination method from the speech data on which the noise is superposed, and a speech recognition is performed on the feature vector of the speech data which has undergone the noise elimination based on the selected acoustic model.

This is advantageous in performing a speech recognition under an environment where the type of noise can be identified but the magnitude (S/N ratio) tends to vary, achieving a high recognition rate under such an environment.

BRIEF DESCRIPTION OF THE DRAWINGS

The present invention will be described with reference to the following figures, wherein like numerals reference like elements, and wherein.

DETAILED DESCRIPTION OF PREFERRED EMBODIMENTS

Figure 1:
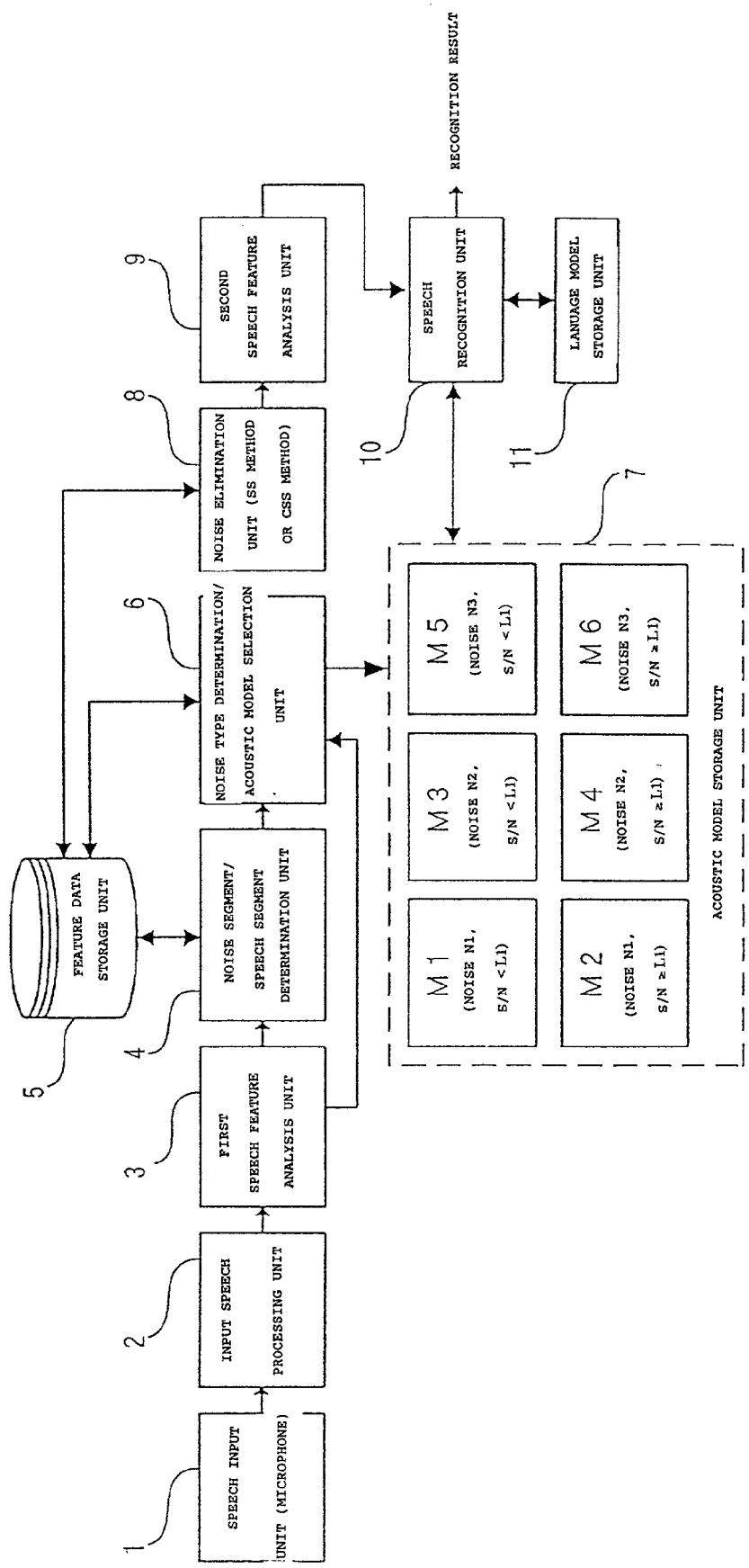
FIG. 1 is a construction diagram for explaining a speech recognition apparatus according to a first embodiment of the present invention.

Embodiments of the present invention will be described below. The description of the embodiments includes a speech recognition method and speech recognition apparatus according to the present invention as well as specific processes of a speech recognition program stored on a storage medium according to the present invention.

Basically, the present invention eliminates noise superposed on a speech to be processed and performs a speech recognition on the speech data from which the noise has been eliminated. With regard to acoustic models used in the speech recognition, several types of noise, such as stationary noise, are assumed. Each of the noises are superposed on speech data corresponding to a speech (clean speech data that does not contain any noise) to generate speech data with the noise superposed thereon. The noise is eliminated from the speech data on which the noise has been superposed, and the acoustic models are created using the speech waveform after the noise elimination process (which somewhat varies from the clean speech data that does not contain any noise). That is, the acoustic models from which noise has been substantially eliminated are created using the above procedure for each of the predefined noise types.

When a speech recognition is actually performed, the type of a noise superposed on speech data to be recognized is determined, the noise is eliminated, an acoustic model is selected according to the type of the noise, and the speech recognition is performed based on the selected acoustic model.

Furthermore, the acoustic models are created for different values of S/N ratio which represents the ratio of the magnitudes of speech data and noise, as well as for each of the noise types. For example, if three types of noise N1, N2, and N3 are selected, three acoustic models are created taking only the noise types into consideration. If two different S/N ratios are assumed for each of the noises, the acoustic models are created in the above procedure with two different magnitudes for each of the noises, thus resulting in six acoustic models.

For example, if two S/N ratio levels, namely, an S/N ratio smaller than a certain value L1 (S/N<L1) and an S/N ratio greater than or equal to L1 (S/N≧L1) are considered, an acoustic model for an S/N ratio smaller than L1 and an acoustic model for an S/N ratio greater than or equal to L1 are created for the noise N1. Similarly, for each of the noise N2 and the noise N3, two acoustic models, i.e., an acoustic model for an S/N ratio smaller than L1 and an acoustic model for an S/N ratio greater than or equal to L1, are created. Thus, in total, six acoustic models are created.

Techniques for the noise elimination described above includes the spectral subtraction (hereinafter referred to as SS) method and the continuous spectral subtraction (hereinafter referred to as CSS) method. These methods are believed to be particularly effective in eliminating noise whose source is hard to be located (referred to as additive noise as described earlier), such as the sound of an automobile, the sound of an air conditioner, and the bustle of the city.

In addition to the SS method and the CSS method, another noise elimination method is the cepstrum mean normalization (hereinafter referred to as CMN) method. This method is believed to be effective in eliminating noise such as distortions due to microphone characteristics and spatial transmission characteristics including echo (referred to as multiplicative noise as described earlier).

The present invention will be described in relation to a first embodiment in which the SS method or the CSS method is employed for noise elimination, a second embodiment in which the CMN method is employed, and a third embodiment in which both of them are employed.

FIG. 1 is a diagram showing an exemplary schematic construction of a speech recognition apparatus according to the first embodiment of the present invention. The speech recognition apparatus can include a microphone 1, an input speech processing unit 2 including an amp and an A/D converter, a first speech feature analysis unit 3, a noise segment/speech segment determination unit 4, a feature analysis data storage unit 5, a noise type determination/acoustic model selection unit 6, an acoustic model storage unit 7, a noise elimination unit 8, a second speech feature analysis unit 9, a speech recognition unit 10, and a language model storage unit 11. The functions and operations of each of the components will be described below with reference to a flowchart shown in FIG. 2.

Figure 2:
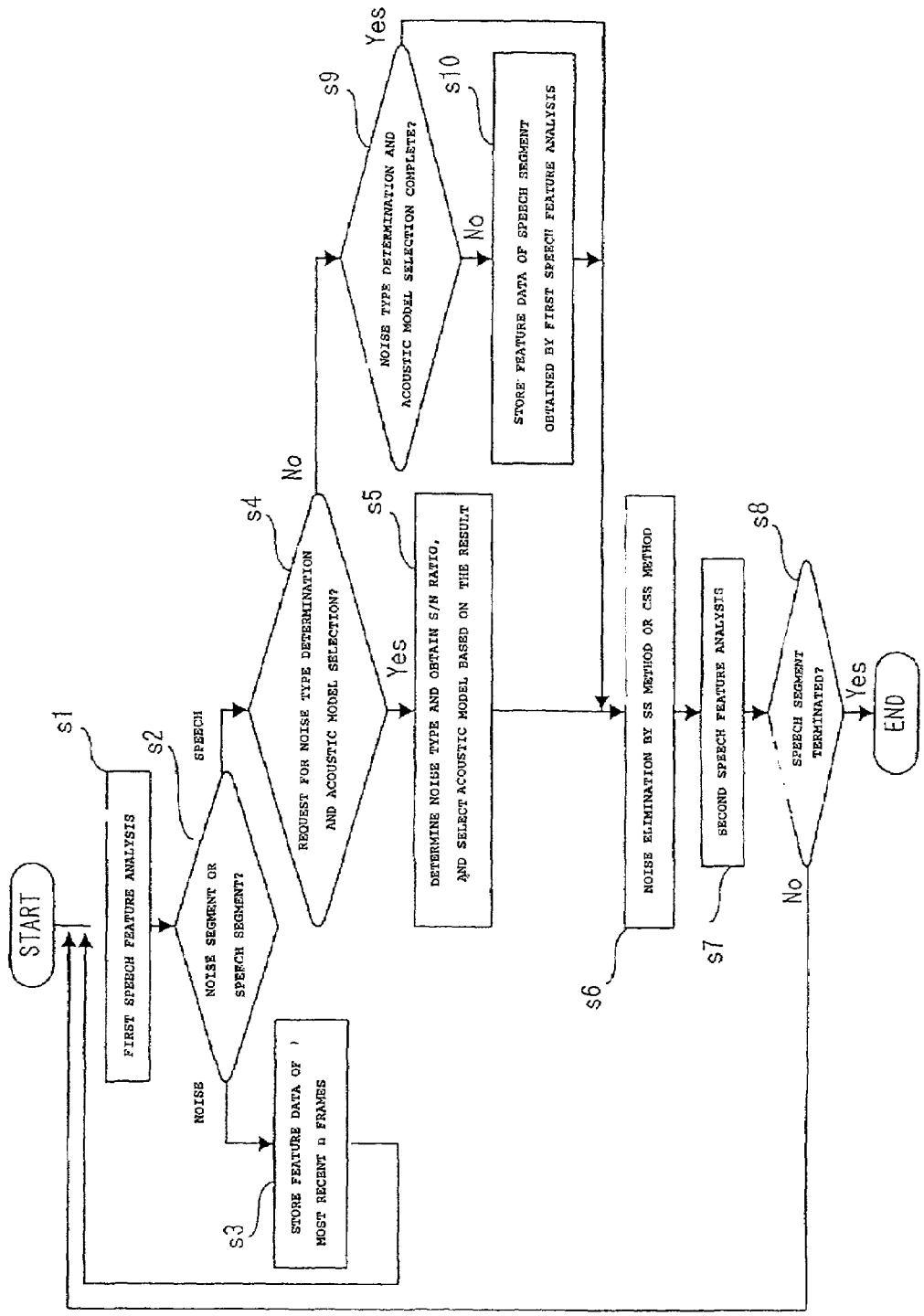
FIG. 2 is a flowchart for explaining an exemplary processing procedure in the first embodiment.

Referring to FIG. 2, the first speech feature analysis unit 3 analyzes the speech feature of speech data to be recognized which has undergone an A/D conversion, on a frame-by-frame basis (the duration of each frame is, for example, on the order of 20 to 30 msec) (step s1). The speech feature analysis is performed in the frequency domain, for example, by FFT (Fast Fourier Transform).

The noise segment/speech segment determination unit 4 determines whether the speech data is a noise segment or a speech segment based on the power, frequency characteristics, etc. obtained by the speech feature analysis (step s2). If the speech data is determined as a noise segment, the feature data of the most recent n frames is stored in the feature data storage unit 5 (step s3). The processes of steps s1 to s3 are repeated until a speech segment is detected, when the noise type determination/acoustic model selection unit 6 starts determination of the noise type and selection of an acoustic model. The noise type determination and the acoustic model selection will be described below.

First, it is determined whether the start of a noise type determination and acoustic model selection has been requested (step s4), and if a request has been made, the type and magnitude (S/N ratio) of the noise is determined and an acoustic model is selected based on the result (step s5).

The type and magnitude of the noise is determined using the feature data of the most recent n frames of the noise segment stored in the feature data storage unit 5 and the feature data of each of the several frames of speech segment obtained by the first speech feature analysis. These feature data represent power as well as frequency characteristics, so that the power of the speech is recognized as well as the type and power of the noise.

For example, in the first embodiment, stationary noise such as the sound of an automobile, the sound of an air conditioner, and the bustle of the city are assumed. Three types of such stationary noise will be considered herein, respectively designated as noise N1, noise N2, and noise N3. Examination of the feature data of the n frames of the noise segment allows determination as to whether the noise segment is most similar to the noise N1, the noise N2, or the noise N3.

Furthermore, the S/N ratio can be obtained from the power of the noise and the power of the speech. Because the S/N ratio must be calculated when the power of the speech segment has a magnitude of a certain degree, the S/N ratio is calculated using the maximum value or the mean value of several frames or all the frames in the speech segment.

When the noise type is determined and the S/N ratio is obtained in the manner described above, next, an acoustic model is then selected. In the first embodiment, acoustic models are created while assuming the three types of stationary noise N1, N2, and N3, an acoustic model for an S/N ratio smaller than L1 and an acoustic model for an S/N ratio greater than or equal to L1 for each of the noise types N1, N2, and N3.

For example, in the first embodiment, the noise N1 with an S/N ratio smaller than L1 is associated with an acoustic model M1, the noise N1 with an S/N ratio greater than or equal to L1 is associated with an acoustic model M2, the noise N2 with an S/N ratio smaller than L1 is associated with an acoustic model M3, the noise N2 with an S/N ratio greater than or equal to L1 is associated with an acoustic model M4, the noise N3 with an S/N ratio smaller than L1 is associated with an acoustic model M5, and the noise N3 with an S/N ratio greater than or equal to L1 is associated with an acoustic model M6. The six acoustic models M1, M2, . . . , and M6 are stored in the acoustic model storage unit 7. The acoustic models M1, M2, . . . , and M6 are created as follows.

Six patterns of noise, i.e., two different S/N ratios (smaller than L1, and greater than or equal to L1) for each of the noises N1, N2, and N3, are prepared, and the six patterns of noise are superposed on speech data that does not contain any noise, whereby six patterns of speech data are created.

The six patterns of speech data are: speech data on which the noise N1 with an S/N ratio smaller than L1 is superposed; speech data on which the noise N1 with an S/N ratio greater than or equal to L1 is superposed; speech data on which the noise N2 with an S/N ratio smaller than L1 is superposed; speech data on which the noise N2 with an S/N ratio greater than or equal to L1 is superposed; speech data on which the noise N3 with an S/N ratio smaller than L1 is superposed; and speech data on which the noise N3 with an S/N ratio greater than or equal to L1 is superposed.

Noise is eliminated from each of the six patterns of speech data by a predetermined noise elimination method, and the six acoustic models M1, M2, . . . , and M6 are created using the feature vectors obtained by analyzing the six patterns of speech data which have undergone the noise elimination.

If it is determined in step s5, for example, that the type of the noise is most similar to the noise N1 and the S/N ratio obtained is smaller than L1 (S/N<L1), the acoustic model M1 is selected from the acoustic model storage unit 7.

When an acoustic model is selected in accordance with the noise type and the S/N ratio, then, the noise is eliminated by the noise elimination unit 8 (step s6). The noise elimination employs the SS method or the CSS method in the first embodiment, and performs a spectral subtraction using the feature data of the most recent n frames of the noise segment stored in the feature data storage unit 5 and the feature data of the speech segment. Thus, speech data from which the noise has been substantially eliminated is obtained. Even after the noise elimination, however, the speech data includes a slight residual of the noise.

Then, the second speech feature analysis unit 9 analyzes the feature of the speech data which has undergone the noise elimination (step s7). The feature analysis by the second speech feature analysis unit 9 will be referred to as the second feature analysis herein.

The second speech feature analysis obtains cepstrum coefficients which will be used when the speech recognition unit 10 performs a speech recognition. Because the speech analysis in step s1 employs a frequency-domain analysis method, such as FFT, the result thereof being speech feature data in the frequency domain, the second speech feature analysis obtains mel frequency cepstrum coefficients as the cepstrum coefficients.

The mel cepstrum coefficients obtained by the second speech feature analysis are supplied to the speech recognition unit 10, and the speech recognition unit 10 performs a speech recognition on the mel cepstrum coefficients. The speech recognition is performed based on the acoustic model selected in step s5 (the acoustic model M1 in the example described earlier) and a language model stored in the language model storage unit 11.

When the second speech feature analysis in step s7 is completed, it is determined whether the speech segment has terminated (step s8), if the speech segment has completely terminated, the processing is exited, and if the speech segment has not terminated, the processing returns to step s1 and the same processes are repeated.

That is, the first speech feature analysis is performed (step s1), it is determined whether the speech data is a noise segment or a speech segment (step s2), and if the speech data is determined as a speech segment, the processing proceeds to step s4 and the subsequent processes. If no request has been made for the selection of an acoustic model, it is determined whether the determination of the noise type and magnitude (S/N ratio) and the selection of an acoustic model based on the result thereof have been completed (step s9), and if the process has been completed, the noise elimination is performed (step s6), whereas if the process has not been completed, the feature data of the speech segment obtained by the first speech feature analysis is stored (step s10).

The series of processes are repeated until the speech segment terminates. As described above, an acoustic model is selected in accordance with the type and S/N ratio of a noise superposed on speech data to be recognized, and a speech recognition is performed based on the selected acoustic model and a predefined language model.

As described above, the six acoustic models M1, M2, . . . , and M6 in the first embodiment have been created by superposing the three types of noise N1, N2, and N3, with two S/N ratios for each, on speech data (clean speech data that does not contain any noise) to generate the six patterns of speech data and eliminating the noise from each of the six patterns of speech data (by the SS method or the CSS method), and using the six patterns of speech data which have undergone the noise elimination (including a slight residual of the noise as opposed to the clean speech data that does not contain any noise). Thus, the six acoustic models have been created based on speech data similar to actual speech data to be recognized.

Thus, a most suitable acoustic model is selected for the actual speech data to be recognized in accordance with the type and S/N ratio of the noise superposed on the speech data, and a speech recognition is performed based on the selected acoustic model, thereby enhancing the accuracy of the recognition.

Furthermore, the first embodiment employs the SS method or the CSS method for noise elimination, reducing the amount of operations required for the noise elimination to such an extent feasible for a CPU with a relatively low operation capability.

This allows implementation in small-scale inexpensive hardware. Furthermore, because the SS method and the CSS method are believed to be effective for elimination of noise such as the sound of an automobile, the sound of an air conditioner, and the bustle of the city, the first embodiment is highly advantageous when applied to devices typically used in environments with a considerable amount of such noise.

Figure 3:
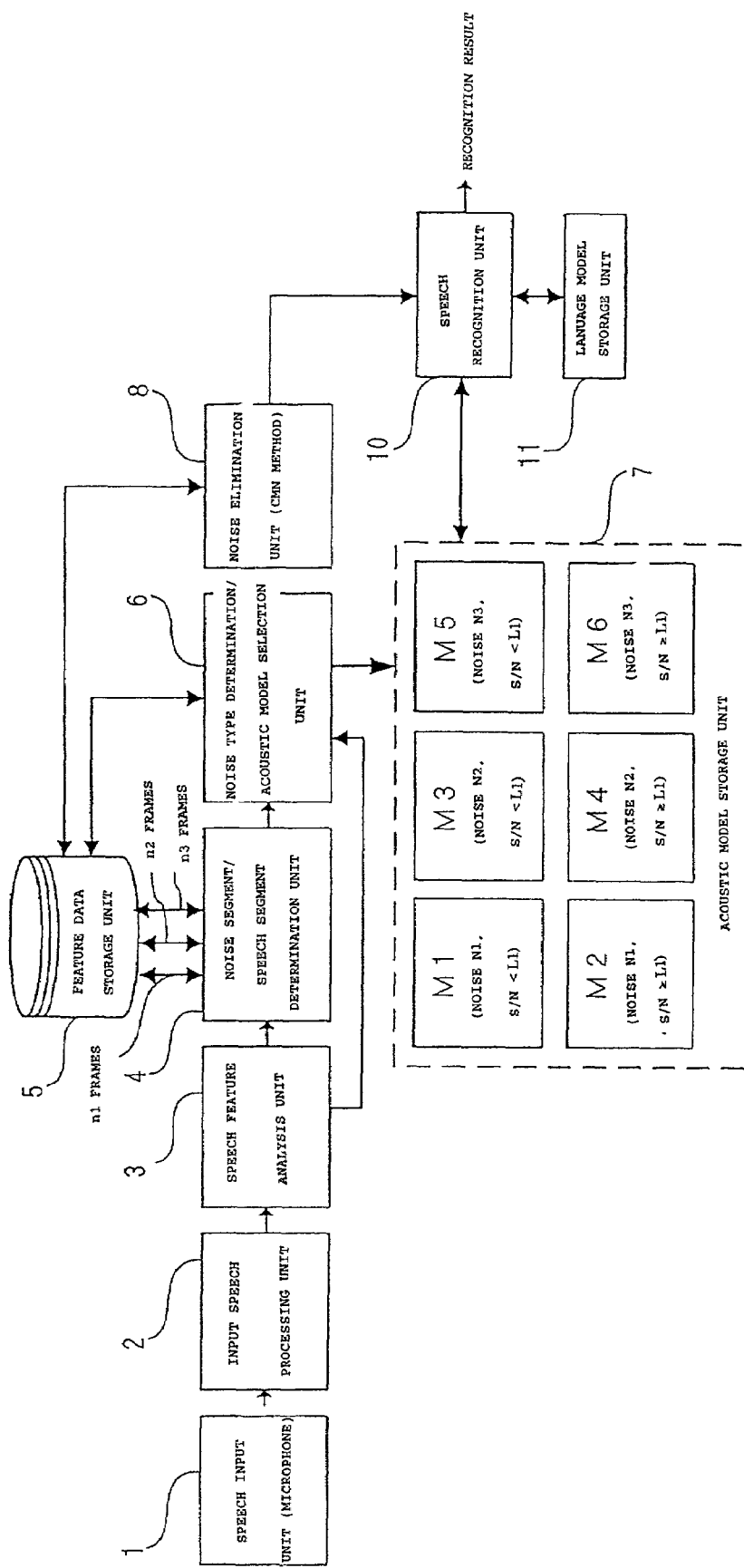
FIG. 3 is a construction diagram for explaining a speech recognition apparatus according to a second embodiment of the present invention.

The second embodiment employs the cepstrum mean normalization (CMN) method for noise elimination. FIG. 3 shows an exemplary schematic construction of a speech recognition apparatus according to the second embodiment of the present invention. The speech recognition apparatus can include a microphone 1, an input speech processing unit 2 including an amp and an A/D converter, a speech feature analysis unit 21, a noise segment/speech segment determination unit 4, a feature data storage unit 5, a noise type determination/acoustic model selection unit 6, an acoustic model storage unit 7, a noise elimination unit 8, a speech recognition unit 10, and a language model storage unit 11. The functions and operations of each of the components will be described below with reference to a flowchart shown in FIG. 4.

Figure 4:
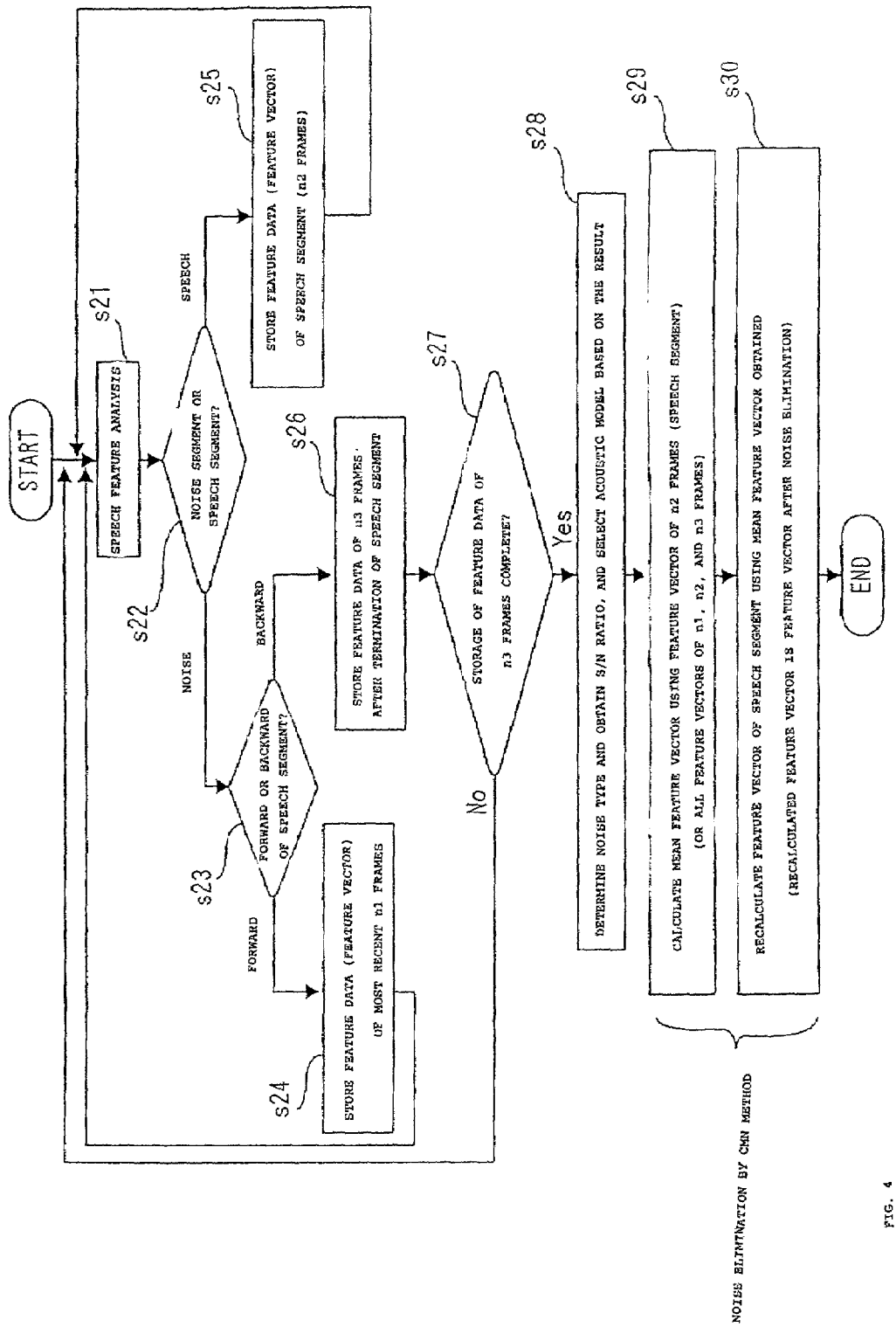
FIG. 4 is a flowchart for explaining an exemplary processing procedure in the second embodiment.

Referring to FIG. 4, the speech feature analysis unit 21 analyzes the feature of speech data to be processed which has undergone an A/D conversion, on a frame-by-frame basis (the duration of each frame is, for example, on the order of 20 to 30 msec) (step s21). The speech feature analysis in the second embodiment obtains cepstrum coefficients (e.g., mel frequency cepstrum coefficients or LPC cepstrum coefficients).

The noise segment/speech segment determination unit 4 determines whether the speech data is a noise segment or a speech segment based on the result of the speech feature analysis (step s22). If it is determined that the speech data is a noise segment, the noise segment/speech segment determination unit 4 further determines whether the noise segment exists at the beginning or the end of the speech segment along the time axis (step s23).

Based on the result of the determination, if the noise segment exists at the beginning of the speech segment along the time axis, the feature data (the feature vector of cepstrum coefficients) of the most recent n1 frames obtained by the feature analysis is stored in the feature data storage unit 5 (step s24). If the speech data is determined as a speech segment, the feature data (the feature vector of cepstrum coefficients) of n2 frames of the speech segment (from the beginning to the end of the speech segment) is stored in the feature data storage unit 5 (step s25).

The speech feature analysis is repeated until a noise segment is detected and the noise segment is determined as existing at the end of the speech segment along the time axis (steps s21, s22, and s23), when it is determined that the speech segment has terminated, and the feature data (the feature vector of cepstrum coefficients) of n3 frames after the end of the speech segment is stored in the feature data storage unit 5 (step s26).

Then, it is determined whether the storage of the feature data of the n3 frames has been completed (step s27), and if the process has been completed, the noise type determination/acoustic model selection unit 6 starts the determination of the noise type and selection of an acoustic model (step s28). The noise type determination and the acoustic model selection will be described below.

The determination of the noise type and the S/N ratio and the selection of an acoustic model are performed using the feature data of the n1 frames and the n2 frames which have been stored in the feature data storage unit 5.

More specifically, which of the noise types is most similar to the noise can be determined using the feature data of the noise segment (e.g., the feature data of the n1 frames), and the S/N ratio can be determined from the power of the noise obtained by analyzing the feature of the noise segment and the power of the speech segment.

In the second embodiment as well, the processing can be based on the three noise types N1, N2, and N3.

Based on the noise type determined and the S/N ratio obtained, one of the acoustic models is selected. Similarly to the first embodiment described earlier, for example, if the noise type is determined as most similar to the noise N1 and the S/N ratio is smaller than L1, an acoustic model M1 is selected.

In the second embodiment, similarly to the first embodiment, six acoustic models M1, M2, . . . , and M6 in accordance with the noise type and the S/N ratio are prepared.

More specifically, in the second embodiment, similarly to the first embodiment, the noise N1 with an S/N ratio smaller than L1 is associated with an acoustic model M1, the noise N1 with an S/N ratio greater than or equal to L1 is associated with an acoustic model M2, the noise N2 with an S/N ratio smaller than L1 is associated with an acoustic model M3, the noise N2 with an S/N ratio greater than or equal to L1 is associated with an acoustic model M4, the noise N3 with an S/N ratio smaller than L1 is associated with an acoustic model M5, and the noise N3 with an S/N ratio greater than or equal to L1 is associated with an acoustic model M6. The six acoustic models M1, M2, . . . , and M6 are stored in the acoustic model storage unit 7.

Because the noise elimination employs the CMN (cepstrum mean normalization) method in the second embodiment, the acoustic models M1, M2, . . . , and M6 are created by the CMN method. More specifically, the acoustic models MI, M2, . . . , and M6 are created as follows.

Six patterns of noise with two different S/N ratios (smaller than L1, and greater than or equal to L1) for each of the noises N1, N2, and N3 are prepared, and the six patterns of noise are superposed on speech data that does not contain any noise, whereby six patterns of speech data are created.

The six patterns of speech data are: speech data on which the noise N1 with an S/N ratio smaller than L1 is superposed; speech data on which the noise N1 with an S/N ratio greater than or equal to L1 is superposed; speech data on which the noise N2 with an S/N ratio smaller than L1 is superposed; speech data on which the noise N2 with an S/N ratio greater than or equal to L1 is superposed; speech data on which the noise N3 with an S/N ratio smaller than L1 is superposed; and speech data on which the noise N3 with an S/N ratio greater than or equal to L1 is superposed.

Noise is eliminated from each of the six patterns of speech data by the CMN method, and the six acoustic models M1, M2, . . . , and M6 are created using the feature vectors of the six patterns of speech data from which the noise has been eliminated.

If it is determined in step s28, for example, that the noise is most similar to the noise N1, and the S/N ratio obtained is smaller than L1, the acoustic model M1 is selected from the acoustic model storage unit 7.

The type and magnitude (S/N ratio) of the noise may be determined only from the feature data of the n1 frames (the feature data of the noise at the beginning of the speech segment) and the feature data of the n2 frames (the feature data of the speech segment from the beginning to the end thereof), the feature data of the n3 frames (the feature data of the noise at the end of the speech segment) may be used in addition.

Then, the noise elimination unit 8 eliminates the noise by the CMN method. In the noise elimination by the CMN method, first, the mean feature vector of the n2 frames is obtained using the feature vector obtained by the speech feature analysis of the speech segment (the feature vector of the n2 frames) (step s29).

The mean feature vector may be obtained using all the feature vectors of n1, n2, and n3 frames instead of only the feature vector of the n2 frames. It will be assumed herein that the mean feature vector is obtained using only the feature vector of the n2 frames of the speech segment from the beginning to the end thereof.

If, for example, n=20, the mean of the feature vectors of the 20 frames (designated as C1, C2, . . . , and C20, each having, for example, 10th order components) is obtained. The mean feature vector obtained is designated as Cm.

Then, using the mean feature vector obtained, the feature vectors of the speech segment (20 frames in this example) are recalculated (step s30). The recalculation subtracts the mean feature vector Cm from each of the feature vectors C1, C2, . . . , and C20 of the 20 frames of the speech segment, i.e., in this example, C1'=C1−Cm, C2'=C2−Cm, . . . , C20'=C20−Cm. C1', C2', . . . , and C20' which have been obtained are the feature vectors of the 20 frames after the noise elimination.

The feature vectors C1' to C20' are supplied to the speech recognition unit 10, and the speech recognition unit 10 performs a speech recognition based on the selected acoustic model and a predefined language model.

As described above, in the second embodiment, similarly to the first embodiment described earlier, an acoustic model is selected in accordance with the noise type and the S/N ratio, and a speech recognition is performed using the selected acoustic model and the language model stored in the language model storage unit 11.

Similarly to the first embodiment, the six acoustic models in the second embodiment are created by superposing the three types of noise N1, N2, and N3, with two different S/N ratios for each, on speech data (clean speech data that does not contain any noise) to generate the six patterns of speech data with the noise superposed thereon, eliminating the noise from each of the six patterns of speech data by the CMN method, and using the six patterns of speech data which have undergone the noise elimination (including slight residue of the noise as opposed to the clean speech data that does not contain any noise). That is, the six acoustic models are created based on speech data similar to actual speech data to be recognized.

Thus, a most suitable acoustic model is selected in accordance with the type and the S/N ratio of the noise superposed on the actual speech data to be recognized, and a speech recognition is performed using the selected acoustic model, thereby enhancing the accuracy of recognition.

Furthermore, the CMN method used for noise elimination in the second embodiment serves to reduce the amount of operations associated with noise elimination to such an extent feasible for a CPU with a relatively low operation capability, permitting implementation in small-scale inexpensive hardware. Furthermore, because the CMN method is believed to be effective in eliminating noise due to microphone characteristics and spatial transmission characteristics including echo (multiplicative noise), it is highly advantageous when applied to devices typically used in environments where such noise is likely to be present.

A third embodiment combines the first embodiment and the second embodiment. In the third embodiment, similarly to the first and the second embodiments, six acoustic models M1, M2, . . . , and M6 are prepared in accordance with the noise types and the S/N ratios. The acoustic models in the third embodiment are created as follows.

As described earlier, the three types of noise N1, N2, and N3 with two S/N ratios for each are superposed on speech data (clean speech data that does not contain any noise) to generate six patterns of speech data with noise superposed thereon, and the noise is eliminated from each of the six patterns of speech data by the SS method or the CSS method to generate six patterns of speech data from which the noise has been substantially eliminated (including slight residue of the noise as opposed to the clean speech data that does not contain any noise).

Then, the CMN method is performed on the six patterns of speech data which have undergone the noise elimination by the SS method or the CSS method. More specifically, as described earlier, the mean feature vector of the n2 frames is obtained using the feature vectors obtained by the feature analysis of the speech segment in each of the speech data (the feature vectors of the n2 frames). If, for example, n2=20, he mean feature vector Cm of the 20 frames (indicated by C1 C2, . . . , and C20, each having, for example, 10th order components) is obtained.

Then, using the mean feature vector obtained, the feature vectors of the speech segment (20 frames in this example) are recalculated, i.e., C1'=C1−Cm, C2'=C2−Cm, . . . , C20'=C20−Cm, obtaining the feature vectors C1, C, . . . , and C20 of each of the 20 frames (of the speech segment), and the acoustic models are created using the feature vectors of each of the frames.

The process is performed with two different S/N ratios for each of the noises N1, N2, and N3, creating the six acoustic models M1, M2, . . . , and M6.

Figure 5:
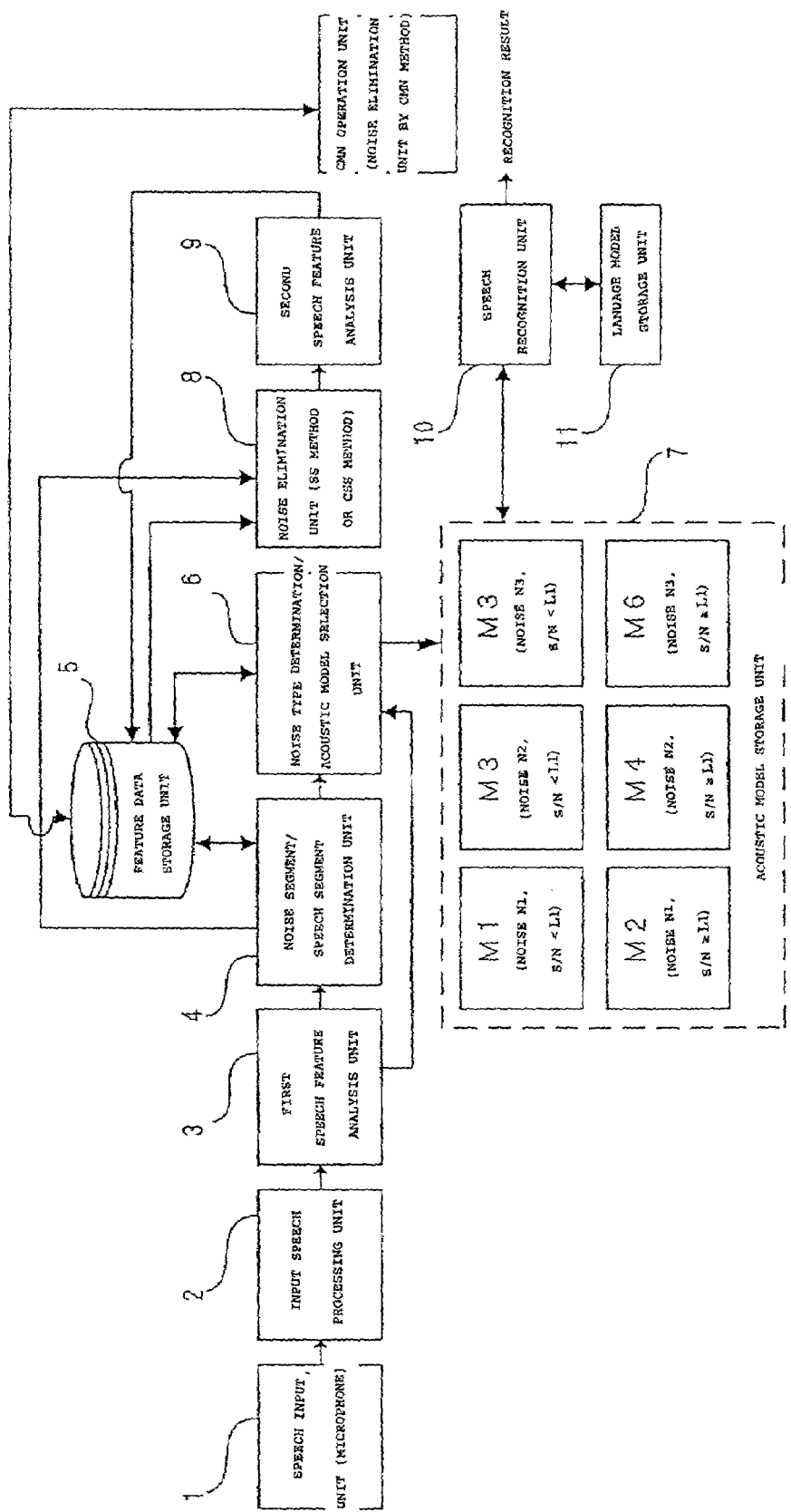
FIG. 5 is a construction diagram for explaining a speech recognition apparatus according to a third embodiment of the present invention.

FIG. 5 is a diagram showing the schematic construction of a speech recognition apparatus according to the third embodiment. The speech recognition apparatus can include a microphone 1, an input speech processing unit 2 including an amp and an A/D converter, a first speech feature analysis unit 3, a noise segment/speech segment determination unit 4, a feature data storage unit 5, a noise type determination/acoustic model selection unit 6, a acoustic model storage unit 7, a noise elimination unit 8, a second speech feature analysis unit 9, a CMN operation unit (CMN noise elimination unit) 31, a speech recognition unit 10, and a language model storage unit 11. The components will be described below with reference to a flowchart shown in FIG. 6.

Figure 6:
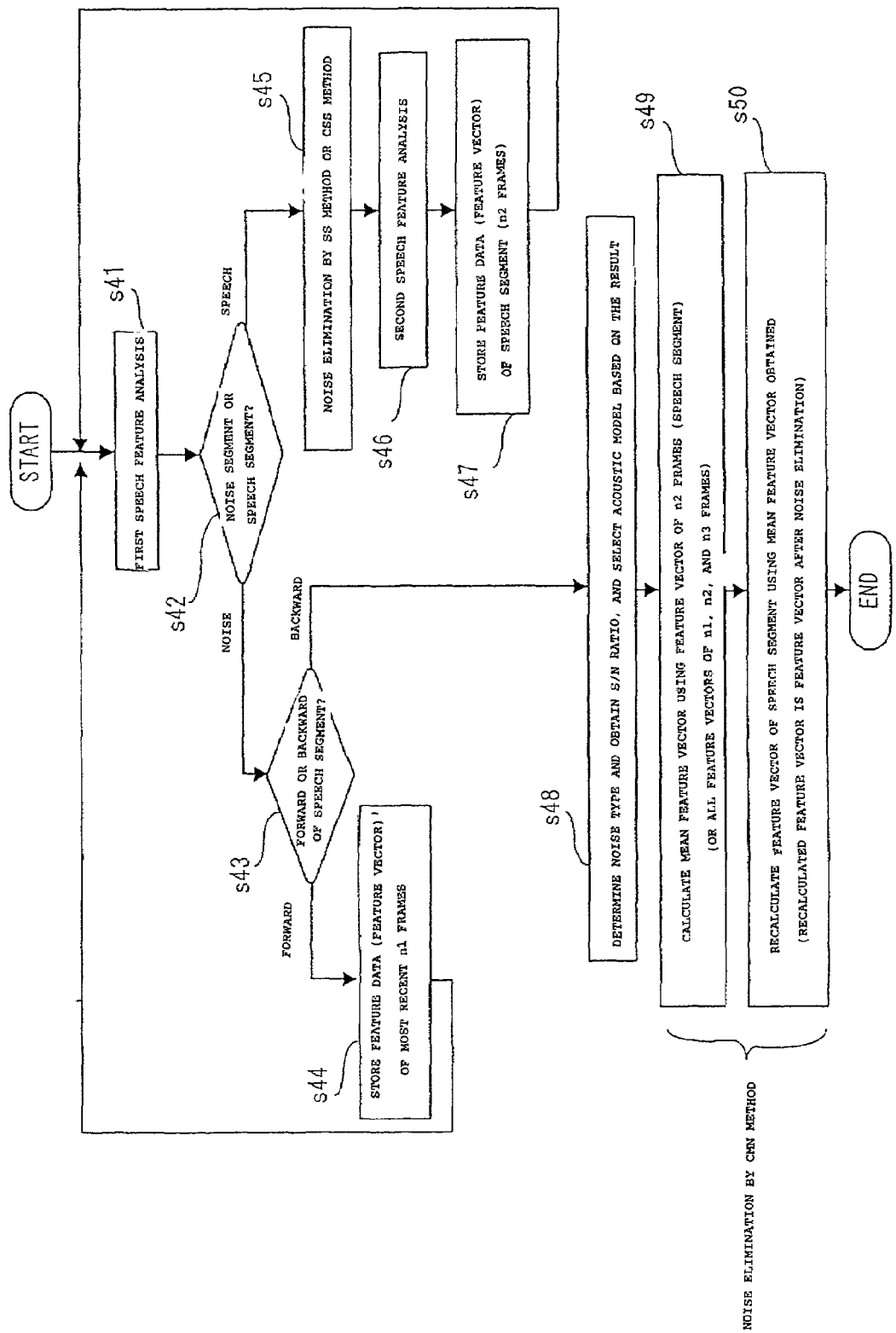
FIG. 6 is a flowchart for explaining an exemplary processing procedure in the third embodiment.

Referring to FIG. 6, first, the first speech feature analysis unit 3 analyzes the feature of speech data to be recognized which has undergone an A/D conversion, on a frame-by-frame basis (the duration of each frame is, for example, on the order of 20 to 30 msec) (step s41). The speech feature analysis is performed in the frequency domain, and similarly as described earlier, for example, by FFT (Fast Fourier Transform).

Based on the result of the speech feature analysis, the noise segment/speech segment determination unit 4 determines whether the speech data is a noise segment or a speech segment (step s42). If the speech data is determined as a noise segment, the noise segment/speech segment determination unit 4 further determines whether the noise segment exists at the beginning or the end of the speech segment along the time axis (step s43). If the noise segment is determined as existing at the beginning of the speech segment along the time axis, the feature data of the most recent nil frames is stored in the feature data storage unit 5 (step s44).

If the speech data is determined as a speech segment, the noise elimination unit 8 eliminates noise by the SS or the CSS method (step s45). Then, the second speech feature analysis unit 9 analyzes the feature of the speech data which has undergone the noise elimination (step s46), and the speech feature data (feature vector) obtained thereby is stored (step s47). The second speech feature analysis obtains mel frequency cepstrum coefficients.

The processing returns to step s41, in which the first speech feature analysis is repeated, and based on the result of the speech feature analysis, it is determined whether the speech data is a noise segment or a speech segment. If it is determined that the speech data is a noise segment and the noise segment exists at the end of the speech segment along the time axis (steps s41, s42, and s43), it is determined that the speech segment has terminated, and the noise type determined and the acoustic model selection in step s48 start.

The determination of the noise type and the magnitude (S/N ratio) and the selection of an acoustic model are performed using the speech feature data of the n1 frames and the n2 frames which have been stored. More specifically, which of the three noise types (N1, N2, and N3) described earlier is most similar to the feature data of the noise segment can be determined using the feature data of the noise segment (e.g., the feature data of the n1 frames), and the S/N ratio can be determined by the power of the noise segment obtained from the feature data of the noise segment and the power of the speech obtained from the feature data of the speech segment.

Based on the noise type and the S/N ratio, one of the acoustic models is selected. Similarly to the first and the second embodiments, for example, if the noise type is most similar to the noise N1 and the S/N ratio is smaller than L1, the acoustic model M1 is selected.

When the acoustic model selection is complete, the CMN operation unit 31 generates speech feature data required for speech recognition (steps s49 and s50). The feature data is generated using the CMN noise elimination method described earlier.

As described above in relation to the second embodiment, the CMN method obtains the mean feature vector Cm of the n2 frames in the procedure described earlier using the feature vectors obtained by the feature analysis of the speech segment (the feature vectors of the n2 frames). Using the mean feature vector Cm, the feature vectors of the speech segment (20 frames in this example) are recalculated, i.e., C1'=C–Cm, C2'=C2–Cm, . . . , and C20'=C20–Cm.

C1', C2', C20' which have been obtained are the feature vectors of each of the 20 frames. The feature vectors C1', C2', . . . , C20' of each of the frames are supplied to the speech recognition unit 10, and the speech recognition unit 10 performs a speech recognition using the selected acoustic model and a language model stored in the language model storage unit 11.

As described above, in the third embodiment, similarly to the first and the second embodiments, an acoustic model is selected in accordance with the noise type and the S/N ratio, and a speech recognition is performed using the selected acoustic model and a predefined language model.

In the third embodiment, acoustic models are created using both the SS method (or the CSS method) and the CMN method. When a speech recognition is actually performed, noise is eliminated by the SS method (or the CSS method), a feature vector is generated by the CMN method from the speech data which has undergone the noise elimination, and the feature vector is supplied to the speech recognition unit 10 for speech recognition, thereby enhancing the accuracy of recognition. Furthermore, the third embodiment can be suitably applied to a wide range of noise including additive noise and multiplicative noise.

It is to be understood that the present invention is not limited to the embodiments described hereinabove, and various modifications can be made without departing from the spirit and scope of the present invention. For example, although an example of three noise types N1, N2, and N3 with two different S/N ratios for each is given in the embodiments, the present invention is not limited thereto.

Furthermore, with respect to the noise types, instead of viewing the sound of an automobile, the sound of an air conditioner, and the bustle of the city as individual noises, a combination of several noises may be considered as a single noise.

As an example, acoustic models for speech recognition may be created by superposing both the sound of an automobile and the sound of an air conditioner on speech data taken in a noise-free environment, eliminating the noise from the speech data by a predetermined noise elimination method, and learning the speech data which has undergone the noise elimination.

As described above, plural types of acoustic models can be created as desired for combinations of stationary noise likely to be present in environments where devices are used. Thus, by preparing several acoustic models most suitable for individual devices, a high recognition rate can be achieved. Furthermore, even better results can be obtained by preparing acoustic models for different S/N ratios.

Furthermore, the constructions of the speech recognition apparatuses shown in FIGS. 1, 3, and 5 are examples of implementation, and the constructions need not be exactly as shown in the figures. For example, although a device for determining the noise type and a device for selecting an acoustic model are implemented in a single unit as the noise type determination/acoustic model selection unit 6, it is to be understood that the noise type determination devices and the acoustic model selection devices may be provided as separate components.

Furthermore, although the embodiments have been described in relation to an example of a plurality of (three) noise types and a plurality of (two) S/N ratio for each of the noise types, the present invention may be applied to speech recognition involving a particular noise (one noise type) with a plurality of S/N ratios.

In that case, speech data on which the particular type of noise with different S/N ratios have been superposed respectively are generated, the noise is eliminated from each of the speech data by a predetermined noise elimination method, and acoustic models corresponding to each of the S/N ratios are created using the feature vectors of the speech data which have undergone the noise elimination.

When a speech recognition is actually performed, the S/N ratio of the noise superposed on speech data to be recognized is determined, and an acoustic model is selected from the acoustic models corresponding to each of the S/N ratios, the noise is eliminated by the predetermined noise elimination method from the speech data to be recognized on which the noise has been superposed, and a speech recognition is performed on the feature vector of the speech data which has undergone the noise elimination based on the selected acoustic model.

Although not shown, a speech recognition apparatus in that case can include an acoustic models corresponding to different S/N ratios created by generating speech data on which different types of noise with different S/N ratios for each have been superposed respectively, eliminating the noise by a predetermined noise elimination method from each of the speech data, and using the feature vectors of each of the speech data which have undergone the noise elimination, an acoustic model storage device for storing the acoustic models, a S/N ratio determination device for determining the S/N ratio of a noise superposed on speech data to be recognized, an acoustic model selection device for selecting an acoustic models from the acoustic models corresponding to different S/N ratios based on the result of the determination noise elimination device for eliminating the noise by the predetermined noise elimination method from the speech data to be recognized on which the noise has been superposed, and speech recognition device for performing a speech recognition on the feature vector of the speech data which has undergone the noise elimination based on the selected acoustic model.

In this case as well, the noise elimination may employ the SS method (or the CSS method) and the CMN method, and by the processing described in relation to the first, the second, and the third embodiments, the S/N ratio of the noise superposed on speech data to be recognized is determined, an acoustic model is selected in accordance with the S/N ratio, and a speech recognition is performed based on the selected acoustic model.

This can be advantageous in performing a speech recognition in environments where the noise type can be identified but the magnitude (S/N ratio) thereof tends to vary, achieving a high recognition rate in such environments. In this case, the noise type has been identified and it is not necessary to determine the noise type, reducing the overall amount of operations to such an extent feasible for a CPU with a relatively low operation capability.

Furthermore, although the embodiments have been described in relation to examples in which the SS method (or the CSS method) and the CMN method are employed for noise elimination, instead of the SS method (or the CSS method) or the CMN method proper, modifications thereof (e.g., the CMN method may be performed by distinguishing non-speech segments and speech segments) may be employed.

Furthermore, for example, $\Delta$ cepstrum coefficients or $\Delta$ power may be used as the speech feature vectors.

Furthermore, the present invention can include a storage medium such as a floppy disk, an optical disk, and a hard disk, on which a program defining the processes for implementing the present invention described above is stored. Alternatively, the program may be obtained via a network.

As described above, according to the present invention, speech data on which different types of noise have been superposed respectively are created, and the noise is eliminated from each of the speech data on which the noise has been superposed, and acoustic models corresponding to each of the noise types are created using the speech data which have undergone the noise elimination. When a speech recognition is actually performed, the type of a noise superposed on speech data to be recognized is determined, and an acoustic model is selected from the acoustic models corresponding to the noise types based on the result of the determination, the noise is eliminated from the speech data to be recognized on which the noise has been superposed by the predetermined noise elimination method, and a speech recognition is performed on the speech data which has undergone the noise elimination based on the selected acoustic model.

Accordingly, the speech recognition is performed based on a most suitable acoustic model in accordance with the type of the noise superposed, achieving a high recognition rate even in a noisy environment.

In particular, if a device is used in an environment where two or three types of stationary noise are present, a high recognition rate can be achieved by creating acoustic models for each of the noise types and performing a speech recognition as described above based on the acoustic models.

One of the noise elimination method which may be employed according to the present invention is the spectral subtraction method or the continuous spectral subtraction method, in which case the noise elimination in the acoustic model creation process is performed by the spectral subtraction method or the continuous spectral subtraction method. When a speech recognition is actually performed, the type of a noise superposed is determined using the feature analysis data of the noise segment, a most suitable acoustic model is selected based on the result of the determination, the noise is eliminated by the spectral subtraction method or the continuous spectral subtraction method from the speech data to be recognized on which the noise has been superposed, and a speech recognition is performed on the result of a feature analysis of the speech data which has undergone the noise elimination based on the selected acoustic model.

By employing the spectral subtraction method or the continuous spectral subtraction method as described above, noise elimination can be executed with a relatively small amount of operations feasible for a CPU with a relatively low operation capability. Accordingly, implementation in small-scale inexpensive hardware is permitted. Furthermore, since the spectral subtraction method and the continuous spectral subtraction method are believed to be effective in eliminating noise such as the sound of an automobile, the sound of an air conditioner, and the bustle of the city (generally referred to as additive noise), it is highly advantageous when applied to devices typically used in an environment with a considerable amount of such noise.

As another example of noise elimination method, the cepstrum mean normalization method may be employed. In that case, the noise elimination in the acoustic model creating process employs the cepstrum mean normalization method. When a speech recognition is actually performed, the type of a noise superposed is determined using the feature analysis data of the noise segment, a most suitable acoustic model is selected based on the result of the determination, the noise is eliminated from the speech data to be recognized on which the noise has been superposed by the cepstrum normalization method, and a speech recognition is performed on the feature vector obtained by the noise elimination based on the selected acoustic model.

By employing the cepstrum mean normalization method for noise elimination, noise elimination can be performed with a small amount of operations feasible for a CPU with a relatively low operation capability.

This allows implementation in small-scale inexpensive hardware. Furthermore, because the cepstrum mean normalization method is believed to be effective in eliminating noise such as distortions due to microphone characteristics and spatial transmission characteristics including echo (generally referred to as multiplicative noise), it is highly advantageous when applied to devices typically used in an environment where such noise is likely to be present.

Furthermore, in addition to the noise types, the acoustic models may be created for different S/N ratios for each of the noise types, so that when a speech recognition is actually performed, the S/N ratio of the noise superposed on the speech data to be recognized is obtained from the power of the noise segment and the power of the speech segment and an acoustic model is selected in accordance with the S/N ratio and the noise type, allowing recognition based on an acoustic model that is in accordance with the power of the noise as well as the noise type. Accordingly, a high recognition rate can be achieved when a speech recognition is performed in environments where each of the noises exist.

Furthermore, the acoustic models may be created using both the spectral subtraction method or the continuous spectral subtraction method and the cepstrum normalization method. In this case, when a speech recognition is actually performed, noise is eliminated by the spectral subtraction method or the continuous spectral subtraction method, and the feature vector of the speech data which has undergone the noise elimination is generated by the cepstrum mean normalization method and the feature vector is supplied to the speech recognition unit for speech recognition, achieving a high accuracy of recognition, and in this case, allowing compatibility with a wide range of noise including the additive noise and the multiplicative noise described earlier.

Furthermore, the acoustic models may be created corresponding to a plurality of S/N ratios for a predetermined noise, so that the S/N ratio of the noise superposed on speech data to be recognized is determined, an acoustic model is selected in accordance with the S/N ratio, the noise is eliminated from the speech data to be recognized on which the noise has been superposed by the predetermined noise elimination method, and a speech recognition is performed on the feature vector of the speech data which has undergone the noise elimination based on the selected acoustic model.

This is advantageous in performing a speech recognition in an environment where a particular type of noise exists and the magnitude (S/N ratio) tends to vary, achieving a high recognition rate in such an environment. In this case, because the type of noise has been identified, the noise type needs not to be determined, reducing the amount of operations to such an extent feasible for a CPU with a relatively low operation capability.

While this invention has been described in conjunction with the specific embodiments thereof, it is evident that many alternatives, modifications and variations will be apparent to those skilled in the art; Accordingly, preferred embodiments of the invention as set forth herein are intended to be illustrative not limiting. There are changes that may be made without departing from the spirit and scope of the invention.

What is claimed is:

1. A speech recognition method, including:
   creating speech data on which different types of noise have been superposed respectively;
   eliminating the noise by a predetermined noise elimination method from each of the speech data on which the noise has been superposed;
   creating acoustic models corresponding to each of a plurality of S/N ratios of each of the noise types;
   storing the acoustic models using feature vectors of each of the speech data which have undergone the noise elimination;
   when a speech recognition is performed, determining the type of a noise superposed on speech data to be recognized;
   selecting a corresponding acoustic model from the acoustic models corresponding to each of the noise types based on the result of the determination;
   eliminating the noise by the predetermined noise elimination method from the speech data to be recognized on which the noise has been superposed; and
   performing a speech recognition on the feature vector of the speech data which has undergone the noise elimination based on the selected acoustic model.

2. The speech recognition method according to claim 1, wherein the noise elimination method is at least one of a spectral subtraction method and a continuous spectral subtraction method, and the acoustic models are created by eliminating the noise by the at least one of the spectral subtraction method and the continuous spectral subtraction method from each of the speech data on which the different types of noise have been superposed, obtaining the feature vectors of each of the speech data which have undergone the noise elimination, and using the feature vectors;
   when a speech recognition is performed, a first speech feature analysis is performed to obtain frequency-domain feature data of the speech data on which the noise has been superposed;
   a determination is made whether the speech data is a noise segment or a speech segment based on the result of the feature analysis, and when a noise segment is detected, the feature data thereof is stored, whereas when a speech segment is detected, the type of the noise superposed is determined based on the feature data having been stored and a corresponding acoustic model is selected from the acoustic models corresponding to each of the noise types based on the result of the determination;
   the noise is eliminated by the at least one of the spectral subtraction method and the continuous spectral subtraction method from the speech data to be recognized on which the noise has been superposed; and
   a second feature analysis is performed on the speech data which has undergone the noise elimination to obtain feature data required in the speech recognition, and a speech recognition is performed on the result of the feature analysis based on the selected acoustic model.

3. The speech recognition method according to claim 1, wherein the noise elimination method is a cepstrum mean normalization method, and the acoustic models are created by eliminating the noise by the cepstrum mean normalization method from each of the speech data on which the different types of noise have been superposed and using the feature vectors of the speech data obtained thereby;
   when a speech recognition is performed, a first speech feature analysis is performed on the speech data to be recognized on which the noise has been superposed to obtain a feature vector representing cepstrum coefficients;
   a determination is made whether the speech data is a noise segment or a speech segment based on the result of the feature analysis, and when a noise segment is detected, the feature vector thereof is stored, and when a speech segment is detected, the feature data of the speech segment from a beginning through an end thereof is stored, the type of the noise superposed is determined based on the feature vector of the noise segment having been stored, and an acoustic model is selected from the acoustic models corresponding to each of the noise types based on the result of the determination;
   the noise is eliminated by the cepstrum mean normalization method from the speech segment on which the noise has been superposed using the feature vector of the speech segment having been stored; and a speech recognition is performed on the feature vector after the noise elimination based on the selected acoustic model.

4. The speech recognition method according to claim 1, wherein the acoustic models corresponding to the plurality of S/N ratios for each of the noise types are created by generating speech data on which noises with the plurality of S/N ratios for each of the noise types have been respectively superposed, eliminating the noises from each of the speech data by a predetermined noise elimination method, and using the feature vectors of each of the speech data which have undergone the noise elimination.

5. The speech recognition method according to claim 4, wherein when the acoustic models corresponding to the plurality of S/N ratios for each of the noise types are created, in addition to determining the type of the noise superposed on the speech data to be recognized, the S/N ratio is obtained from a magnitude of the noise in a noise segment and a magnitude of the speech in a speech segment, and an acoustic model is selected based on a noise type determined and the S/N ratio obtained.

6. The speech recognition method according to claim 1, wherein a total number of acoustic models equals N×L, where N is a number of different noise types, and L is a number of S/N ratios for each of the N noise types.

7. A speech recognition method, wherein speech data on which different types of noise have been superposed respectively are created, the noise is eliminated by a spectral subtraction method or a continuous spectral subtraction method from each of the speech data on which the different types of noise have been superposed, a cepstrum mean normalization method is applied to each of the speech data which have undergone the noise elimination to obtain feature vectors of a speech segment, and acoustic models corresponding to each of the noise types are created and stored based on the feature vectors;

when a speech recognition is performed, a first speech feature analysis is performed to obtain frequency-domain feature data of speech data to be recognized;

a determination is made whether the speech data is a noise segment or a speech segment based on the result of the feature analysis, and when a noise segment is detected, the feature vector thereof is stored, and when a speech segment is detected, the noise is eliminated from the speech segment by the spectral subtraction method or the continuous spectral subtraction method;

a second speech feature analysis is performed on the speech segment data which has undergone the noise elimination to obtain cepstrum coefficients, and the feature vector of the speech segment is stored;

when the speech segment has terminated, the type of the noise superposed is determined based on the feature data of the noise segment having been stored, and an acoustic model is selected from the acoustic models corresponding to each of the noise types;

the cepstrum mean normalization method is applied to the feature vector of the speech segment on which the noise has been superposed, using the feature vector of the speech segment having been stored, to obtain the feature vector of the speech segment; and a speech recognition is performed on the feature vector obtained by the cepstrum mean normalization method based on the selected acoustic model.

8. The speech recognition method according to claim 7, wherein the acoustic models corresponding to the plurality of S/N ratios for each of the noise types are created by generating speech data on which noises with the plurality of S/N ratios for each of the noise types have been respectively superposed, eliminating the noises from each of the speech data by the spectral subtraction method or the continuous spectral subtraction method, and using the feature vectors of each of the speech data obtained by applying the cepstrum mean normalization method to each of the speech data which have undergone the noise elimination.

9. The speech recognition method according to claim 8, wherein when the acoustic models corresponding to the plurality of S/N ratios for each of the noise types are created, in addition to determining the type of the noise superposed on the speech data to be recognized, the S/N ratio is obtained from a magnitude of the noise in a noise segment and a magnitude of the speech in a speech segment, and an acoustic model is selected based on the noise type determined and the S/N ratio obtained.

10. The speech recognition method according to claim 7, wherein a total number of acoustic models equals N×L, where N is a number of different noise types, and L is a number of S/N ratios for each of the N noise types.

11. A speech recognition method, comprising:

creating speech data on which a particular type of noise with different S/N ratios have been superposed respectively;

eliminating the noise by a predetermined noise elimination method from each of the speech data;

creating and storing acoustic models corresponding to each of the S/N ratios using feature vectors of each of the speech data which have undergone the noise elimination;

when a speech recognition is performed, determining the S/N ratio of a noise superposed on speech data to be recognized;

selecting a corresponding acoustic model from the acoustic models corresponding to each of the S/N ratios based on the result of the determination;

eliminating the noise by the predetermined noise elimination method from the speech data to be recognized on which the noise has been superposed; and performing a speech recognition on the feature vector of the speech data which has undergone the noise elimination based on the selected acoustic model, wherein, when speech data on which another type of noise also with different S/N ratios have been superposed is created, other acoustic models are created corresponding to each of the S/N ratios of the other noise type.

12. The speech recognition method according to claim 11, wherein the noise elimination method is at least one of a spectral subtraction method and a continuous spectral subtraction method.

13. The speech recognition method according to claim 11, wherein the noise elimination method is a cepstrum mean normalization method.

14. The speech recognition method according to claim 11, wherein a total number of acoustic models equals N×L, where N is a number of different noise types, and L is a number of S/N ratios for each of the N noise types.

15. A storage medium storing a speech recognition program, the speech recognition program, the speech recognition program comprising the steps of:

creating speech data on which different types of noise have been superposed respectively, eliminating the noise by a predetermined noise elimination method from each of the speech data on which the noise has been superposed, and creating acoustic models corresponding to each of a plurality of S/N ratios of each of the noise types using the feature vectors obtained by analyzing the features of each of the speech data which have undergone the noise elimination, and storing the acoustic models in acoustic model storage device;

determining the type of a noise superposed on speech data to be recognized, and selecting a corresponding acoustic model from the acoustic models stored in said acoustic model storage device based on the result of the determination;

eliminating the noise by the predetermined noise elimination method from the speech data to be recognized on which the noise has been superposed; and performing a speech recognition on the feature vector of the speech data which has undergone the noise elimination based on the selected acoustic model.

16. The storage medium storing a speech recognition program according to claim 15, wherein the noise elimination method is at least one of a spectral subtraction method and a continuous spectral subtraction method, and the acoustic models are created by eliminating the noise by the spectral subtraction method or the continuous spectral subtraction method from each of the speech data on which the different types of noise have been superposed, obtaining the feature vectors of each of the speech data which have undergone the noise elimination, and using the feature vectors, the process of speech recognition comprises the steps of:

performing a first speech feature analysis to obtain frequency-domain feature data of the speech data on which the noise has been superposed;

determining whether the speech data is a noise segment or a speech segment based on the result of the feature analysis, storing the feature data thereof when a noise segment is detected, whereas when a speech segment is detected, determining the type of the noise superposed based on the feature data having been stored and selecting a corresponding acoustic model from the acoustic models corresponding to each of the noise types based on the result of the determination;

eliminating the noise by the spectral subtraction method or the continuous spectral subtraction method from the speech data to be recognized on which the noise has been superposed; and performing a second feature analysis on the speech data which has undergone the noise elimination to obtain feature data required in the speech recognition, and performing a speech recognition on the result of the feature analysis based on the selected acoustic model.

17. The storage medium storing a speech recognition program according to claim 15, wherein the noise elimination method is a cepstrum mean normalization method, and the acoustic models are created by eliminating the noise by the cepstrum mean normalization method from each of the speech data on which the different types of noise have been superposed and using the feature vectors of the speech data obtained thereby, the process of speech recognition comprises the steps of:

performing a first speech feature analysis on the speech data to be recognized on which the noise has been superposed to obtain a feature vector representing cepstrum coefficients;

determining whether the speech data is a noise segment or a speech segment based on the result of the feature analysis, and storing the feature vector thereof when a noise segment is detected, whereas when a speech segment is detected, storing the feature data of the speech segment from the beginning through the end thereof, determining the type of the noise superposed based on the feature vector of the noise segment having been stored, and selecting an acoustic model from the acoustic models corresponding to each of the noise types based on the result of the determination;

eliminating the noise by the cepstrum mean normalization method from the speech segment on which the noise has been superposed using the feature vector of the speech segment having been stored, and performing a speech recognition on the feature vector after the noise elimination based on the selected acoustic model.

18. The storage medium storing a speech recognition program according to claim 15, wherein the acoustic models corresponding to the plurality of S/N ratios for each of the noise types are created by generating speech data on which noises with the plurality of S/N ratios for each of the noise types have been respectively superposed, eliminating the noises from each of the speech data by a predetermined noise elimination method, and using the feature vectors of each of the speech data which have undergone the noise elimination.

19. The storage medium storing a speech recognition program according to claim 18, wherein when the acoustic models corresponding to the plurality of S/N ratios for each of the noise types are created, in addition to determining the type of the noise superposed on the speech data to be recognized, the S/N ratio is obtained from a magnitude of the noise in a noise segment and a magnitude of the speech in a speech segment, and an acoustic model is selected based on the noise type determined and the S/N ratio obtained.

20. The storage medium storing a speech recognition program according to claim 15, wherein a total number of acoustic models equals N×L, where N is a number of different noise types, and L is a number of S/N ratios for each of the N noise types.

21. A storage medium storing a speech recognition program, the speech recognition program comprising the steps of:

creating speech data on which different types of noise have been superposed respectively, eliminating the noise by at least one of a spectral subtraction method and a continuous spectral subtraction method from each of the speech data on which the different types of noise have been superposed, applying a cepstrum mean normalization method to each of the speech data which have undergone the noise elimination to obtain the feature vectors of a speech segment, and creating acoustic models corresponding to each of a plurality of S/N ratios of each of the noise types based on the feature vectors and storing the acoustic models in acoustic model storage means;

performing a first speech feature analysis to obtain frequency-domain feature data of speech data to be recognized on which a noise has been superposed;

determining whether the speech data is a noise segment or a speech segment based on the result of the feature analysis, and storing the feature vector thereof when a noise segment is detected;

eliminating the noise from the speech segment by the at least one of the spectral subtraction method and the continuous spectral subtraction method when a speech segment is detected;

performing a second speech feature analysis on the speech segment data which has undergone the noise elimination to obtain cepstrum coefficients, and storing the feature vector of the speech segment;

when the speech segment has terminated, determining the type of the noise superposed based on the feature data of the noise segment having been stored, and selecting an acoustic model from the acoustic models corresponding to each of the noise types;

applying the cepstrum mean normalization method to the feature vector of the speech segment on which the noise has been superposed, using the feature vector of the speech segment having been stored, to obtain the feature vector of the speech segment; and performing a speech recognition on the feature vector obtained by the cepstrum mean normalization method based on the selected acoustic model.

22. The storage medium storing a speech recognition program according to claim 21, wherein the acoustic models corresponding to the plurality of S/N ratios for each of the noise types are created by generating speech data on which noises with the plurality of S/N ratios for each of the noise types have been respectively superposed, eliminating the noises from each of the speech data by the at least one of the spectral subtraction method and the continuous spectral subtraction method, and using the feature vectors of each of the speech data obtained by applying the cepstrum mean normalization method to each of the speech data which have undergone the noise elimination.

23. The storage medium storing a speech recognition program according to claim 22, wherein when the acoustic models corresponding to the plurality of S/N ratios for each of the noise types are created, in addition to determining the type of the noise superposed on the speech data to be recognized, the S/N ratio is obtained from a magnitude of the noise in a noise segment and a magnitude of the speech in a speech segment, and an acoustic model is selected based on the noise type determined and the S/N ratio obtained.

24. The storage medium storing a speech recognition program according to claim 21, wherein a total number of acoustic models equals N×L, where N is a number of different noise types, and L is a number of S/N ratios for each of the N noise types.

25. A storage medium storing a speech recognition program, the speech recognition program comprising the steps of:

creating speech data on which a particular type of noise with different S/N ratios have been superposed respectively, eliminating the noise by a predetermined noise elimination method from each of the speech data, and creating acoustic models corresponding to each of the S/N ratios using the feature vectors of each of the speech data which have undergone the noise elimination and storing the acoustic models in acoustic model storage device;

determining the S/N ratio of a noise superposed on speech data to be recognized, and selecting a corresponding acoustic model from the acoustic models corresponding to each of the S/N ratios based on the result of the determination;

eliminating the noise by the predetermined noise elimination method from the speech data to be recognized on which the noise has been superposed; and performing a speech recognition on the feature vector of the speech data which has undergone the noise elimination based on the selected acoustic model, wherein, when speech data on which another type of noise also with different S/N ratios have been superposed in created, other acoustic models are created corresponding to each of the S/N ratios of the other noise type.

26. The storage medium storing a speech recognition program according to claim 25, wherein the noise elimination method is at least one of a spectral subtraction method and a continuous spectral subtraction method.

27. The storage medium storing a speech recognition program according to claim 25, wherein the noise elimination method is a cepstrum mean normalization method.

28. The storage medium storing a speech recognition program according to claim 25, wherein a total number of acoustic models equals N×L, where N is a number of different noise types, and L is a number of S/N ratios for each of the N noise types.

29. A speech recognition apparatus, comprising:

acoustic models corresponding to each of a plurality of S/N ratios of each of different types of noise, created by generating speech data on which the different types of noise have been superposed respectively, eliminating the noise by a predetermined noise elimination method from each of the speech data on which the different types of noise have been superposed, and using the feature vectors of each of the speech data which have undergone the noise elimination;

an acoustic model storage device that stores the acoustic models;

a noise determination device that determines the type of a noise superposed on speech data to be recognized;

an acoustic model selection device that selects a corresponding acoustic model from the acoustic models corresponding to each of the noise types based on the result of the determination;

a noise elimination device that eliminates the noise by the predetermined noise elimination method from the speech data to be recognized on which the noise has been superposed; and a speech recognition device that performs a speech recognition on the feature vector of the speech data which has undergone the noise elimination based on the selected acoustic model.

30. The speech recognition apparatus according to claim 29, wherein the noise elimination method is at least one of a spectral subtraction method and a continuous spectral subtraction method, and the acoustic models are created by eliminating the noise by the at least one of the spectral subtraction method and the continuous spectral subtraction method from each of the speech data on which the different types of noise have been superposed, obtaining the feature vectors of each of the speech data which have undergone the noise elimination, and using the feature vectors, the speech recognition apparatus comprises:

an acoustic model storage device that stores the acoustic models thus created;

a first speech feature analysis device that performs a first speech feature analysis to obtain frequency-domain feature data of the speech data on which the noise has been superposed;

a noise segment/speech segment determination device that determines whether the speech data is a noise segment or a speech segment based on the result of the feature analysis, and when a noise segment is detected, storing the feature data thereof in feature data storage means;

a noise type determination device that determines the type of noise the type of the noise superposed based on the feature data having been stored when a speech segment is detected;

an acoustic model selection device that selects a corresponding acoustic model from the acoustic models corresponding to each of the noise types based on the result of the determination;
a noise elimination device that eliminates the noise by the at least one of the spectral subtraction method and the continuous spectral subtraction method from the speech data to be recognized on which the noise has been superposed;
a second speech feature analysis device that performs a second feature analysis on the speech data which has undergone the noise elimination to obtain feature data required in the speech recognition; and
a speech recognition device that performs a speech recognition on the result of the feature analysis based on the selected acoustic model.

31. The speech recognition apparatus according to claim 29, wherein the noise elimination method is a cepstrum mean normalization method, and the acoustic models are created by eliminating the noise by the cepstrum mean normalization method from each of the speech data on which the different types of noise have been superposed and using the feature vectors of the speech data obtained thereby, the speech recognition apparatus comprises:
an acoustic model storage device that stores the acoustic models thus created;
a feature analysis device that performs a first speech feature analysis on the speech data to be recognized on which the noise has been superposed to obtain a feature vector representing cepstrum coefficients;
a noise segment/speech segment determination device that determines whether the speech data is a noise segment or a speech segment based on the result of the feature analysis, and storing the feature vector thereof in feature data storage means when a noise segment is detected, whereas when a speech segment is detected, storing the feature data of the speech segment from a beginning through a end thereof in the feature data storage device;
a noise type determination device that determines the type of the noise superposed based on the feature vector of the noise segment having been stored in the feature data storage device;
an acoustic model selection device that selects a corresponding acoustic model from the acoustic models corresponding to each of the noise types based on the result of the determination;
a noise elimination device that eliminates the noise by the cepstrum mean normalization method from the speech segment on which the noise has been superposed using the feature vector of the speech segment having been stored; and
a speech recognition device that performs a speech recognition on the feature vector after the noise elimination based on the selected acoustic model.

32. The speech recognition apparatus according to claim 29, wherein the acoustic models corresponding to the plurality of S/N ratios for each of the noise types are created by generating speech data on which noises with the plurality of S/N ratios for each of the noise types have been respectively superposed, eliminating the noises from each of the speech data by a predetermined noise elimination method, and using the feature vectors of each of the speech data which have undergone the noise elimination.

33. The speech recognition apparatus according to claim 32, wherein when the acoustic models corresponding to the plurality of S/N ratios for each of the noise types are created, in addition to determining the type of the noise superposed on the speech data to be recognized, the noise type determination device obtains the S/N ratio from the magnitude of the noise in the noise segment and the magnitude of the speech in the speech segment, and the acoustic model selection device selects an acoustic model based on the noise type determined and the S/N ratio obtained.

34. The speech recognition apparatus according to claim 29, wherein a total number of acoustic models equals N×L, where N is a number of different noise types, and L is a number of S/N ratios for each of the N noise types.

35. A speech recognition apparatus, comprising:
acoustic models corresponding to each of a plurality of S/N ratios of each of different types of noise, created by generating speech data on which the different types of noise have been superposed respectively, eliminating the noise by a spectral subtraction method or a continuous spectral subtraction method from each of the speech data on which the different types of noise have been superposed, applying a cepstrum mean normalization method to each of the speech data which have undergone the noise elimination to obtain the feature vectors of a speech segment, and using the feature vectors;
an acoustic model storage device that stores the acoustic models;
a first speech feature analysis device that performs a first speech feature analysis to obtain frequency-domain feature data of speech data to be recognized;
a noise segment/speech segment determination device that determines whether the speech data is a noise segment or a speech segment based on the result of the feature analysis, and stores the feature vector thereof in feature data storage means when a noise segment is detected;
a noise elimination device that eliminates the noise from the speech segment by the spectral subtraction method or the continuous spectral subtraction method when a speech segment is detected;
a second speech feature analysis device that performs a second speech feature analysis on the speech segment data which has undergone the noise elimination to obtain cepstrum coefficients, and storing the feature vector of the speech segment in the feature data storage device;
a noise type determination device that determines, when the speech segment has terminated, the type of the noise superposed based on the feature data of the noise segment having been stored;
an acoustic model selection device that selects a corresponding acoustic model from the acoustic models corresponding to each of the noise types;
a cepstrum mean normalization operation device that applies the cepstrum mean normalization method to the feature vector of the speech segment on which the noise has been superposed, using the feature vector of the speech segment having been stored, to output the feature vector of the speech segment; and
a speech recognition device that performs a speech recognition on the feature vector based on the selected acoustic model.

36. The speech recognition apparatus according to claim 35, wherein the acoustic models corresponding to the plurality of S/N ratios for each of the noise types are created by generating speech data on which noises with the plurality of S/N ratios for each of the noise types have been respectively superposed, eliminating the noises from each of the speech data by the spectral subtraction method or the continuous spectral subtraction method, and using the feature vectors of each of the speech data obtained by applying the cepstrum mean normalization method to each of the speech data which have undergone the noise elimination.

37. The speech recognition apparatus according to claim 36, wherein when the acoustic models corresponding to the plurality of S/N ratios for each of the noise types are created, in addition to determining the type of the noise superposed on the speech data to be recognized, the noise type determination device obtains the S/N ratio from a magnitude of the noise in a noise segment and a magnitude of a speech in the speech segment, and the acoustic model device means selects an acoustic model based on the noise type determined and the S/N ratio obtained.

38. The speech recognition apparatus according to claim 35, wherein a total number of acoustic models equals N×L, where N is a number of different noise types, and L is a number of S/N ratios for each of the N noise types.

39. A speech recognition apparatus, comprising:
acoustic models corresponding to each of different S/N ratios for a particular type of noise, created by generating speech data on which the particular type of noise with the different S/N ratios have been superposed respectively, eliminating the noise by a predetermined noise elimination method from each of the speech data, and using the feature vectors of each of the speech data which have undergone the noise elimination;
an acoustic models storage device that stores the acoustic models;
a S/N ratio determination means for determining the S/N ratio of a noise superposed on speech data to be recognized;
an acoustic model selection device that selects a corresponding acoustic model from the acoustic models corresponding to each of the S/N ratios based on the result of the determination;
a noise elimination device that eliminates the noise by the predetermined noise elimination method from the speech data to be recognized on which the noise has been superposed; and
a speech recognition device that performs a speech recognition on the feature vector of the speech data which has undergone the noise elimination based on the selected acoustic model,
wherein, when speech data on which another type of noise also with different S/N ratios have been superposed is created, other acoustic models are created corresponding to each of the S/N ratios of the other noise type.

40. The speech recognition apparatus according to claim 39, wherein the noise elimination method is at least one of a spectral subtraction method and a continuous spectral subtraction method.

41. The speech recognition apparatus according to claim 39, wherein the noise elimination method is a cepstrum mean normalization method.

42. The speech recognition apparatus according to claim 39, wherein a total number of acoustic models equals N×L, where N is a number of different noise types, and L is a number of S/N ratios for each of the N noise types.

* * * * *